United States Patent
Han

(10) Patent No.: US 9,476,401 B2
(45) Date of Patent: Oct. 25, 2016

(54) MARINE HYDROKINETIC TURBINE

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 14/838,867

(22) Filed: Aug. 28, 2015

(65) Prior Publication Data
US 2016/0010620 A1    Jan. 14, 2016

Related U.S. Application Data

(60) Continuation-in-part of application No. 14/829,354, filed on Aug. 18, 2015, which is a continuation-in-part of application No. 14/255,377, filed on Apr. 17, 2014, now Pat. No. 9,151,269, which
(Continued)

(51) Int. Cl.
*H02K 21/24* (2006.01)
*F03B 13/26* (2006.01)
(Continued)

(52) U.S. Cl.
CPC ........... *F03B 13/264* (2013.01); *F03B 15/08* (2013.01); *F03B 15/12* (2013.01); *F03B 17/063* (2013.01); *F03D 3/0436* (2013.01); *F05B 2240/12* (2013.01); *F05B 2240/93* (2013.01); *F05B 2240/97* (2013.01); *F05B 2260/40* (2013.01); *F05B 2260/402* (2013.01); *F05B 2260/40311* (2013.01); *F05B 2260/42* (2013.01); *Y02E 10/28* (2013.01); *Y02E 10/38* (2013.01); *Y02E 10/74* (2013.01); *Y10T 74/18056* (2015.01); *Y10T 74/2101* (2015.01)

(58) Field of Classification Search
CPC .................................................. H02K 21/024
USPC ............................................ 322/20; 310/191
See application file for complete search history.

(56) References Cited

U.S. PATENT DOCUMENTS 2,484,197 A * 10/1949 Veldhuis ............... F03D 9/002
  290/44
4,695,736 A * 9/1987 Doman ................ F03D 7/0272
  290/44
(Continued)

FOREIGN PATENT DOCUMENTS

JP     2008208959 A * 9/2008
SE     WO 8101444 A1 * 5/1981 ............... F03D 7/02
(Continued)

*Primary Examiner* — Joseph Waks
(74) *Attorney, Agent, or Firm* — Cameron LLP

(57) ABSTRACT

A marine hydrokinetic electric power generator comprises one of a stator and a rotor which is adjustably movable through an infinite number of positions from being proximate to one another so that their magnetic fields overlap mostly to a position such that the rotor is most distant from the stator and has little overlap of magnetic field strength. Hatch and speed control may be also provided by a spur/helical gear assembly of sun and planetary gear sets referred to herein as a Transgear™ gear assembly. The variable (or fixed) power generator in operation may comprise one of a rotor and a stator being out of phase with one another by an angle, for example, the one of the rotor or the stator leading or lagging the other and the phase angle, frequency or voltage of output power to a power grid corrected responsive to inputs from the power grid and the marine hydrokinetic turbine.

20 Claims, 15 Drawing Sheets

Related U.S. Application Data is a continuation-in-part of application No. 13/915,785, filed on Jun. 12, 2013, now Pat. No. 8,702,552, which is a division of application No. 13/568,288, filed on Aug. 7, 2012, now Pat. No. 8,485,933, which is a continuation-in-part of application No. 13/425,501, filed on Mar. 21, 2012, now Pat. No. 8,641,570, which is a continuation-in-part of application No. 13/384,621, filed as application No. PCT/US2010/042519 on Jul. 20, 2010, now Pat. No. 8,388,481.

(60) Provisional application No. 62/039,096, filed on Aug. 19, 2014, provisional application No. 61/521,408, filed on Aug. 9, 2011, provisional application No. 61/523,846, filed on Aug. 16, 2011.

(51) Int. Cl.
  *F03B 15/08* (2006.01)
  *F03B 15/12* (2006.01)
  *F03D 3/04* (2006.01)
  *F03B 17/06* (2006.01)

(56) References Cited

U.S. PATENT DOCUMENTS

| | | | | |
|---|---|---|---|---|
| 6,064,161 A * | 5/2000 | Takahara | | B60W 10/04 180/197 |
| 6,537,168 B1 * | 3/2003 | Han | | F16H 29/04 475/8 |
| 6,555,941 B1 * | 4/2003 | Zepp | | H02K 21/024 310/114 |
| 6,943,478 B2 * | 9/2005 | Zepp | | H02K 7/12 310/191 |
| 7,081,689 B2 | 7/2006 | Tilscher et al. | | |
| 7,462,124 B2 * | 12/2008 | Han | | F16H 3/721 475/270 |
| 7,804,263 B2 * | 9/2010 | Himmelmann | | H02K 7/12 290/34 |
| 8,133,149 B2 | 3/2012 | Smithson et al. | | |
| 8,388,481 B2 | 3/2013 | Han | | |
| 8,485,933 B2 | 7/2013 | Han | | |
| 8,641,570 B2 | 2/2014 | Han | | |
| 8,702,552 B2 | 4/2014 | Han | | |
| 2002/0068658 A1 * | 6/2002 | Suzuki | | F16D 7/028 475/257 |
| 2007/0082779 A1 * | 4/2007 | Han | | F16H 3/721 475/325 |
| 2009/0041584 A1 | 2/2009 | Gray et al. | | |
| 2010/0237626 A1 | 9/2010 | Hamner | | |
| 2012/0211990 A1 | 8/2012 | Davey et al. | | |
| 2013/0043686 A1 * | 2/2013 | Eitan | | F03D 11/02 290/55 |

FOREIGN PATENT DOCUMENTS

| | | |
|---|---|---|
| WO | WO92/14298 | 8/1992 |
| WO | WO2011/011358 | 1/2011 |

\* cited by examiner

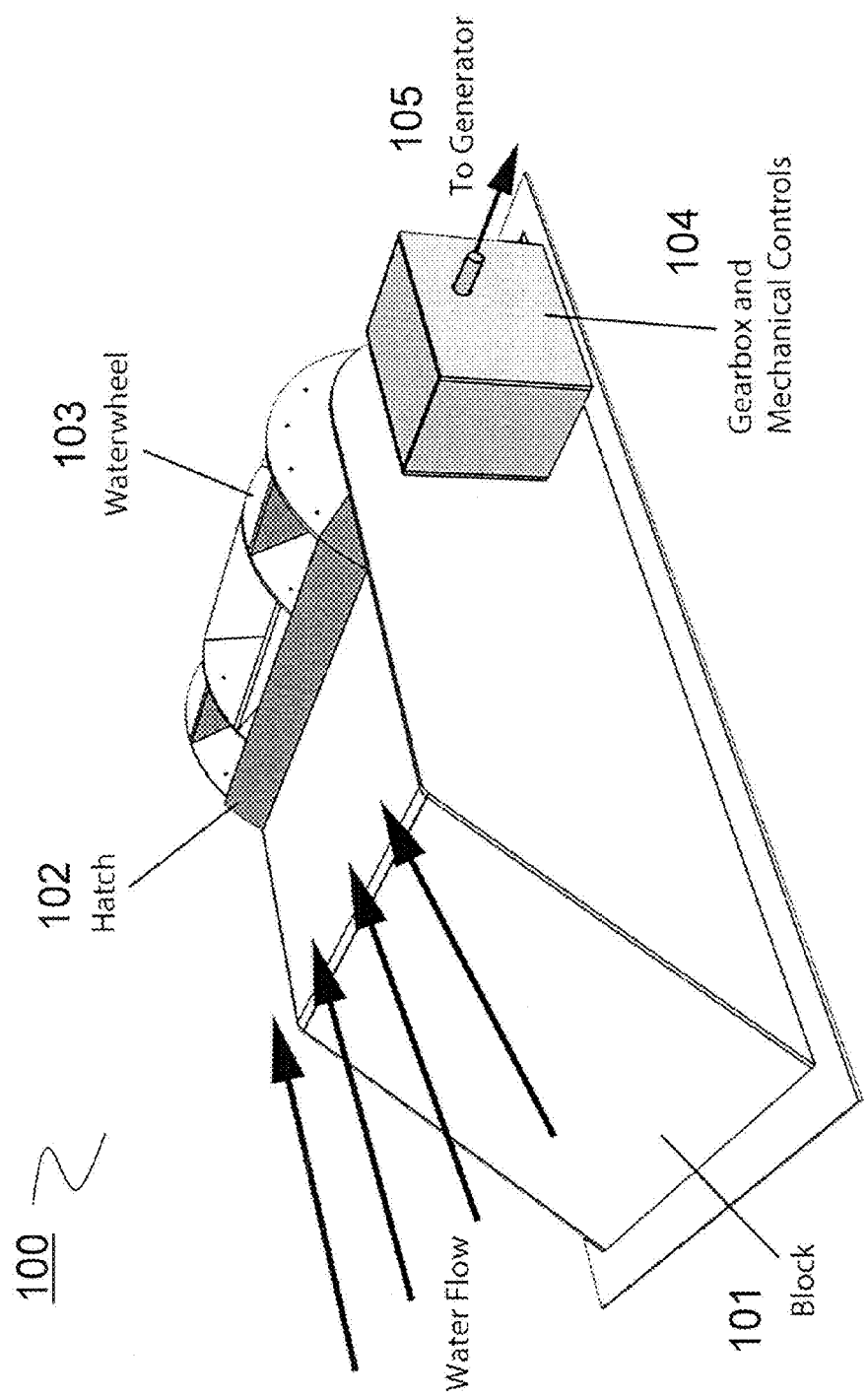
Figure 1: Perspective View of a Bottom-mounted MHK Turbine

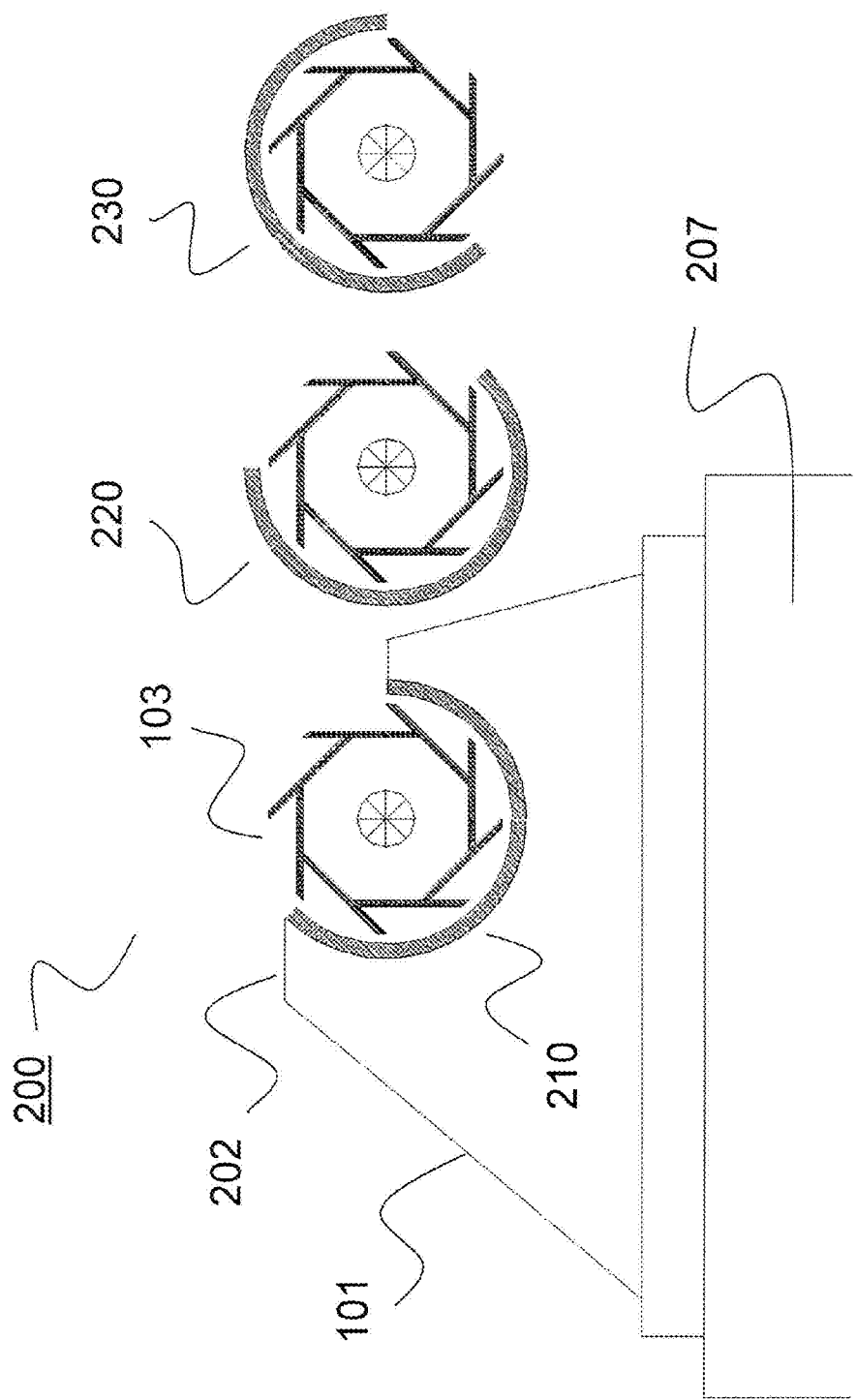
Figure 2. Side View of a Bottom Mounted MHK Turbine

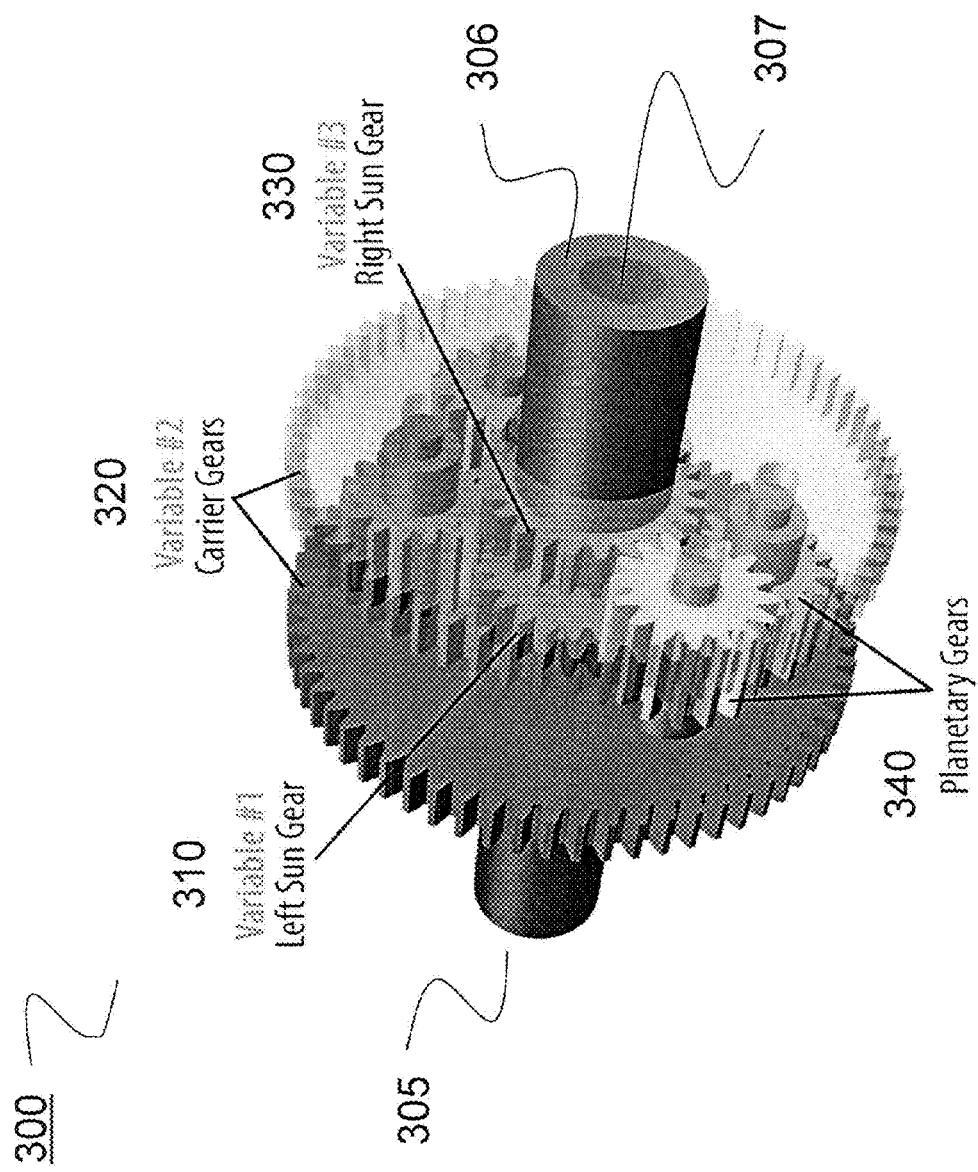
Figure 3. Three (to N) Variable Basic Spur Gear Transgear™ Gear Assembly

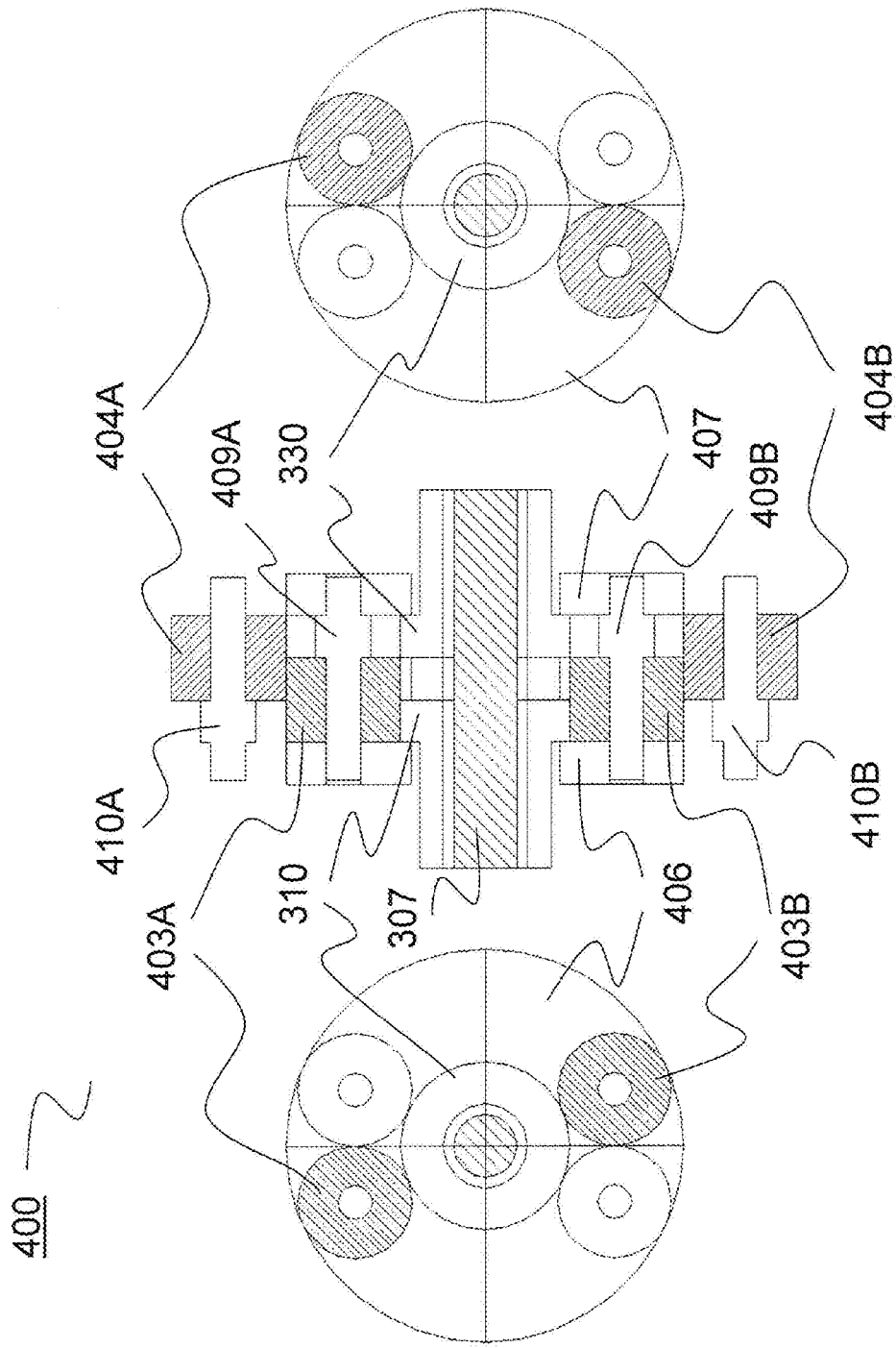

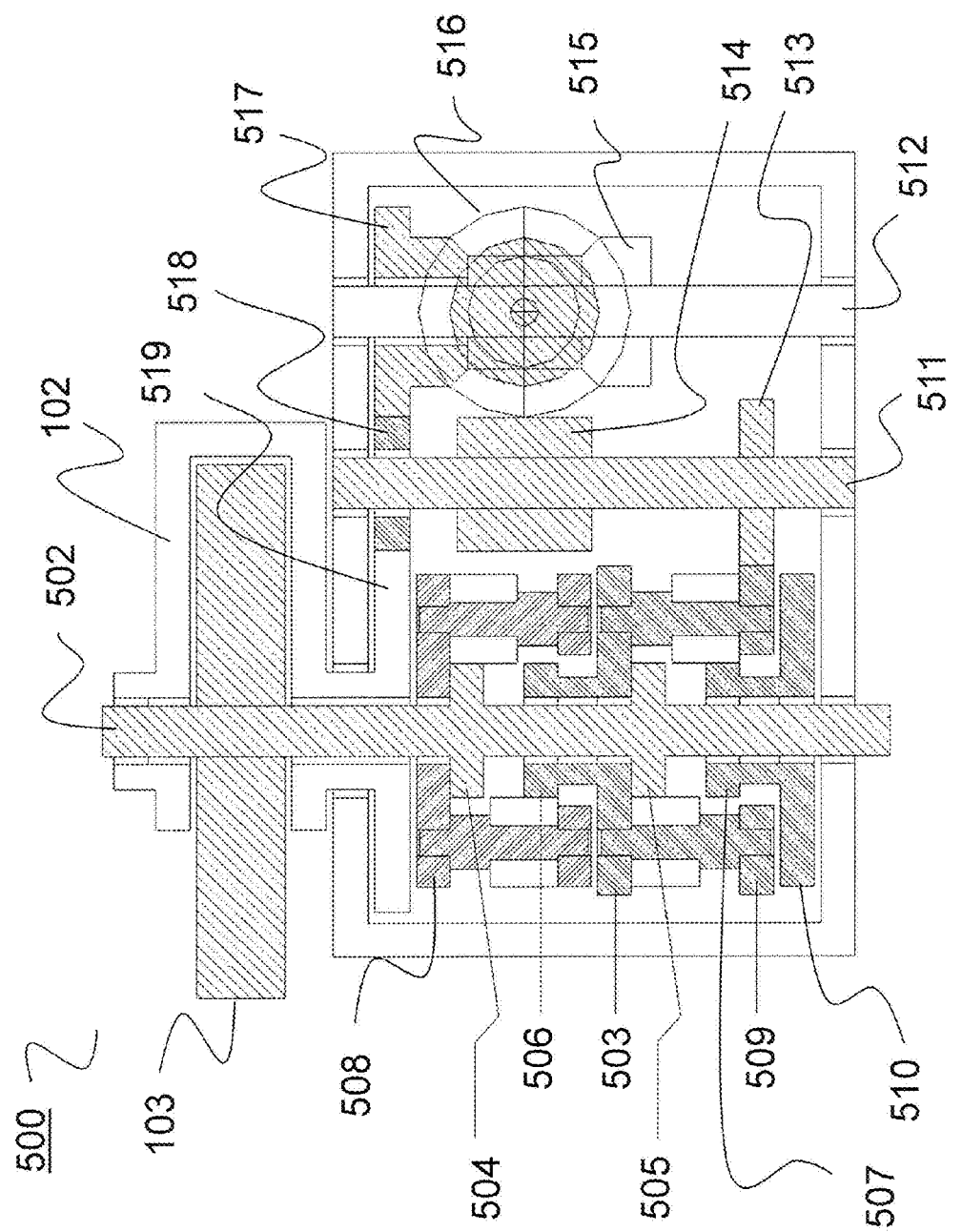
Figure 5. Hatch Control with Transgears

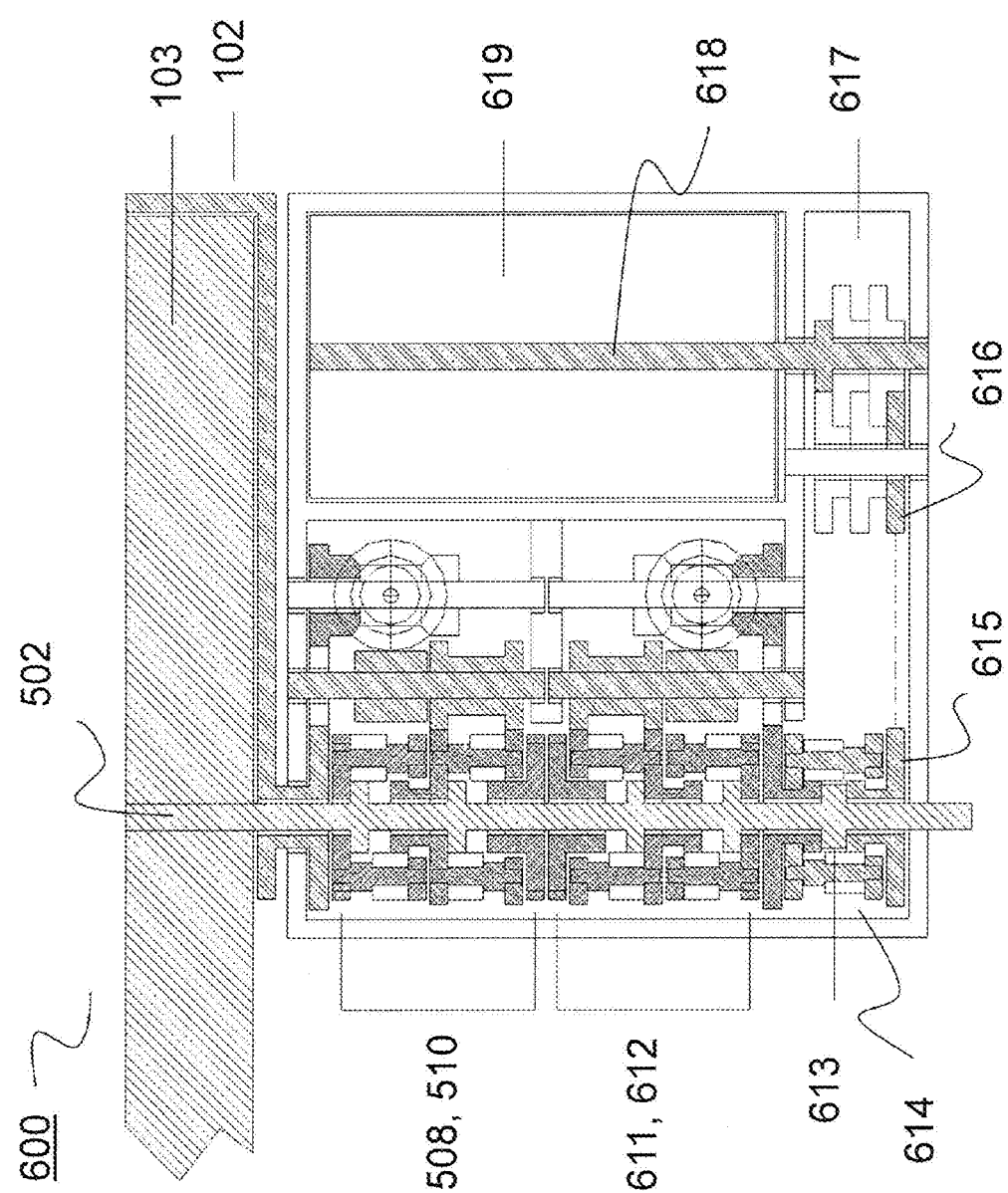
Figure 6. MHK Turbine with Hatch Control and Speed Control

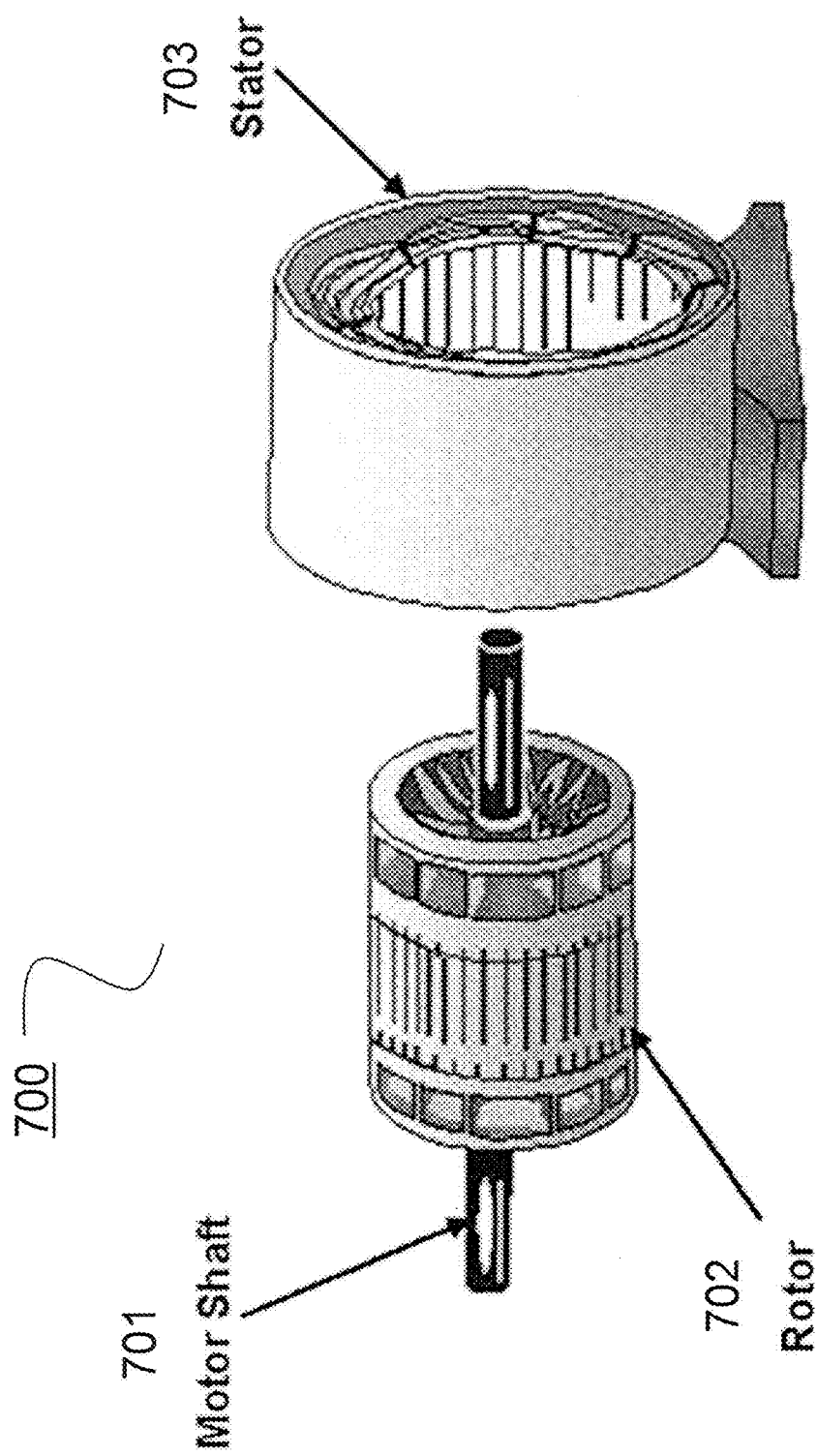
Figure 7: Perspective View of a Variable Power Generator

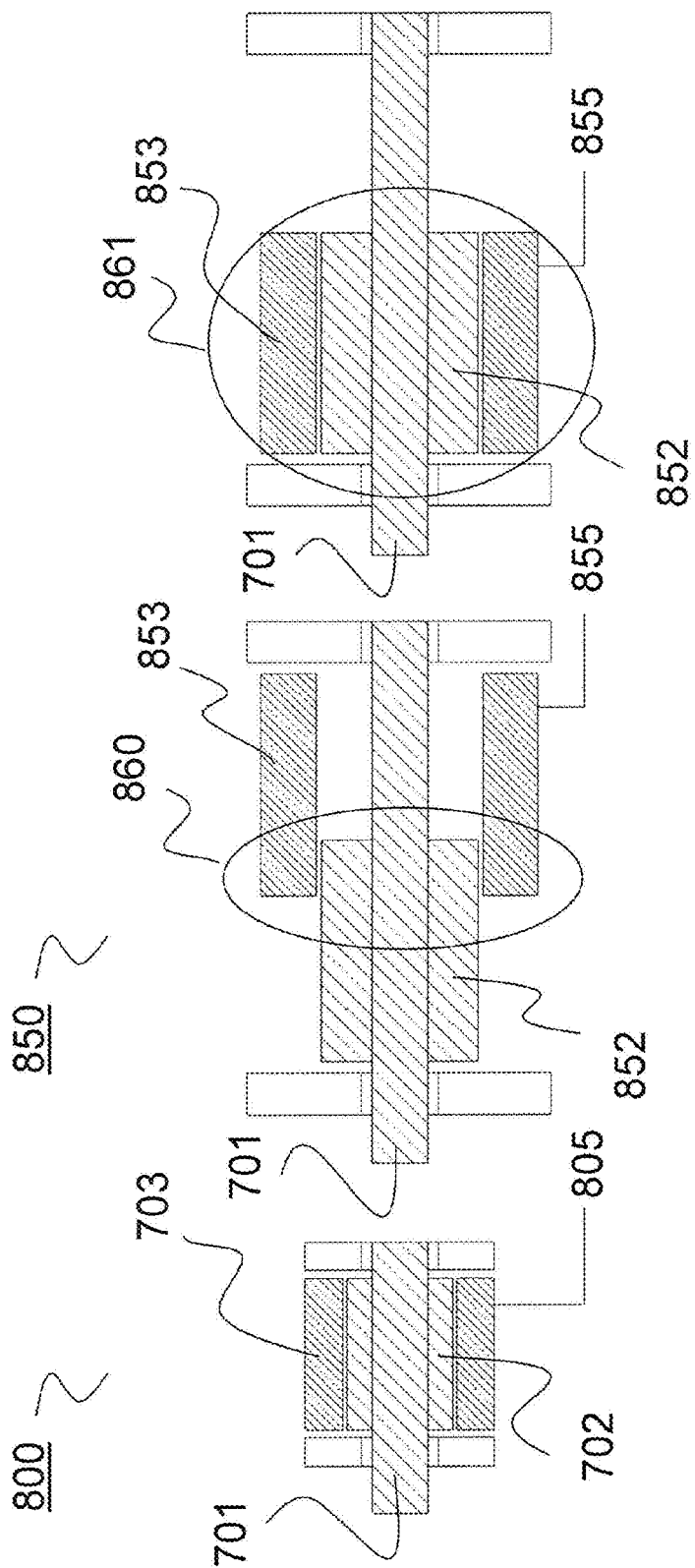

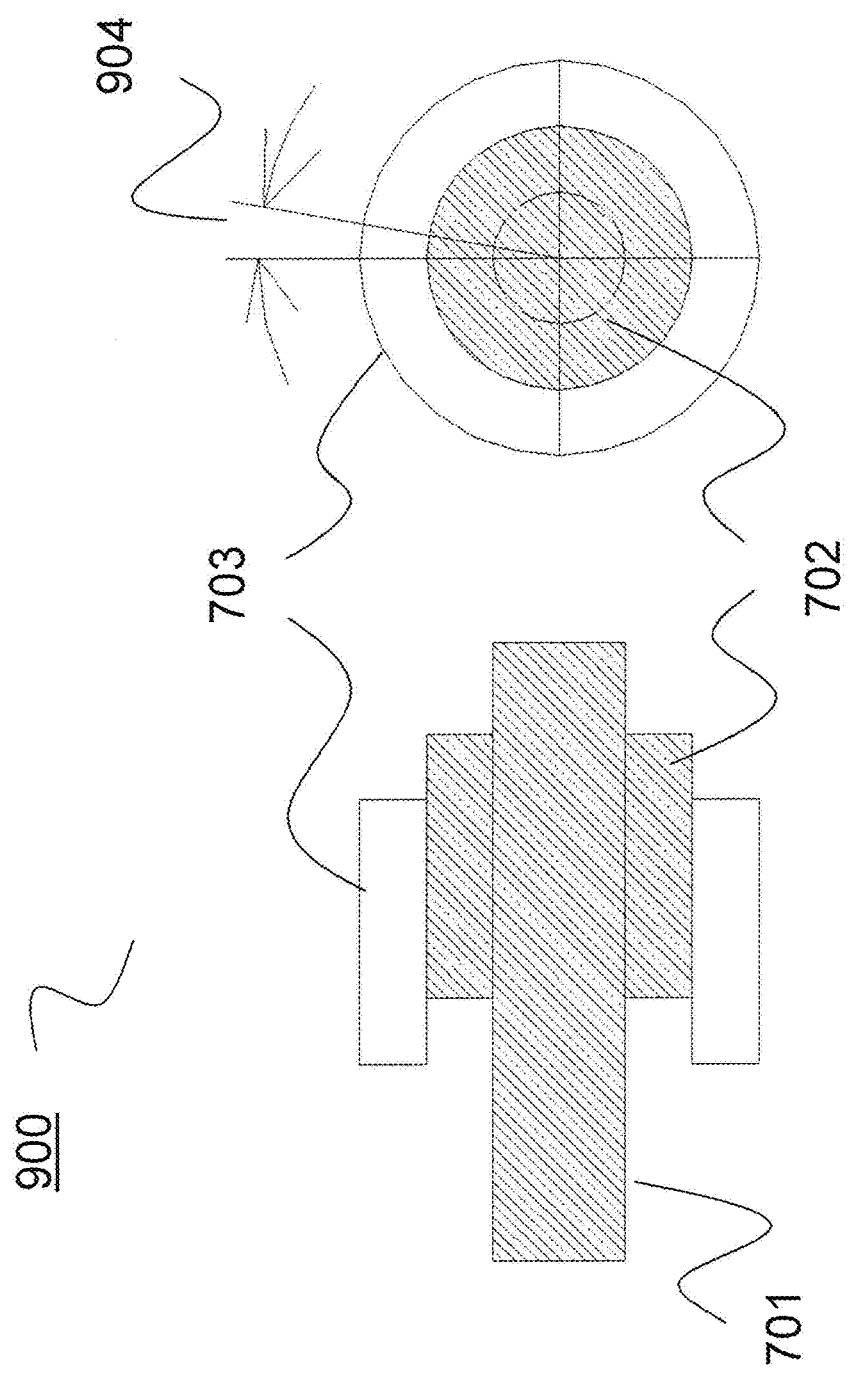
Figure 9A: Front View
Figure 9B: Side View

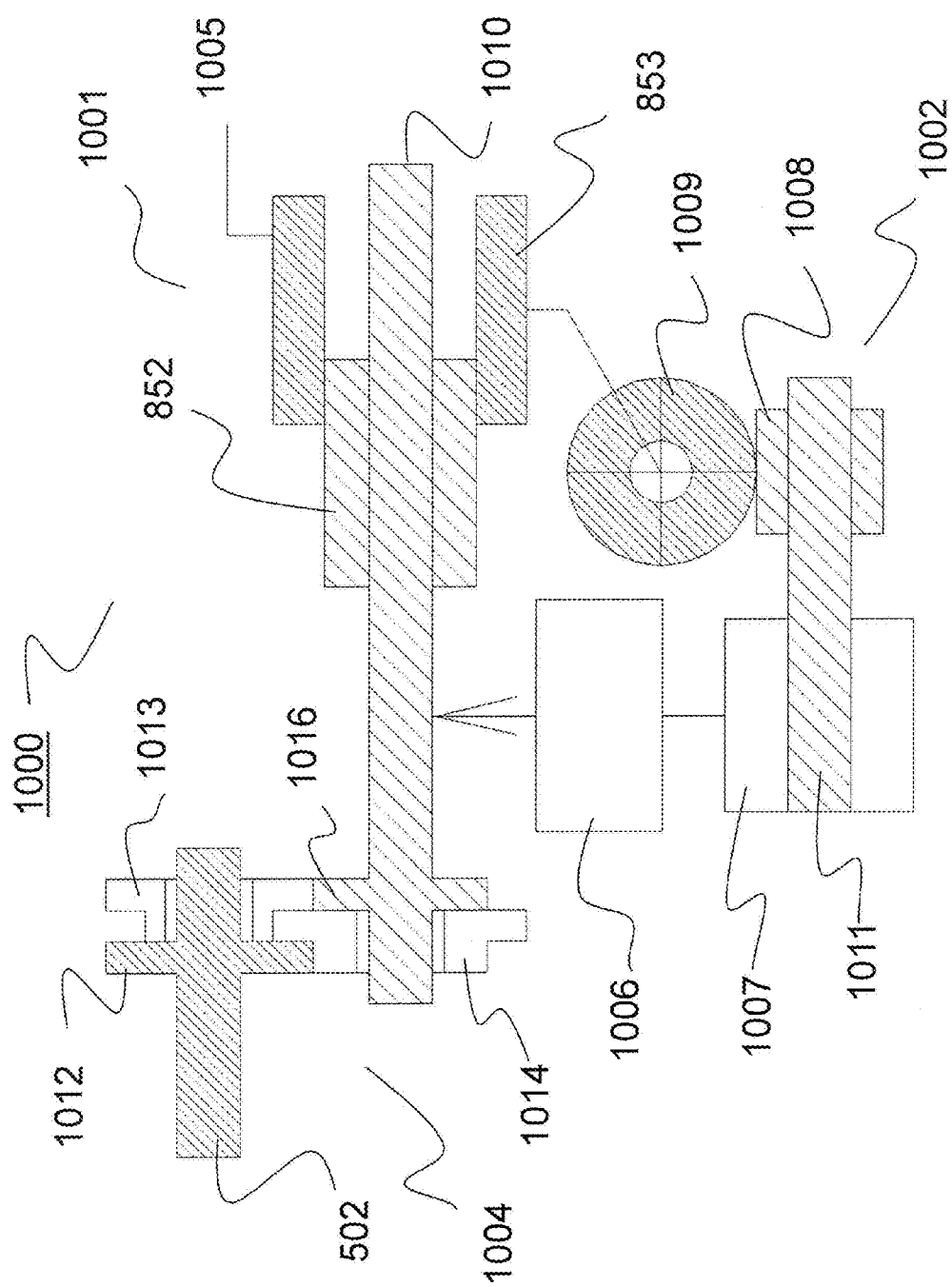
Figure 10: Electronically-controlled Variable Power Generator

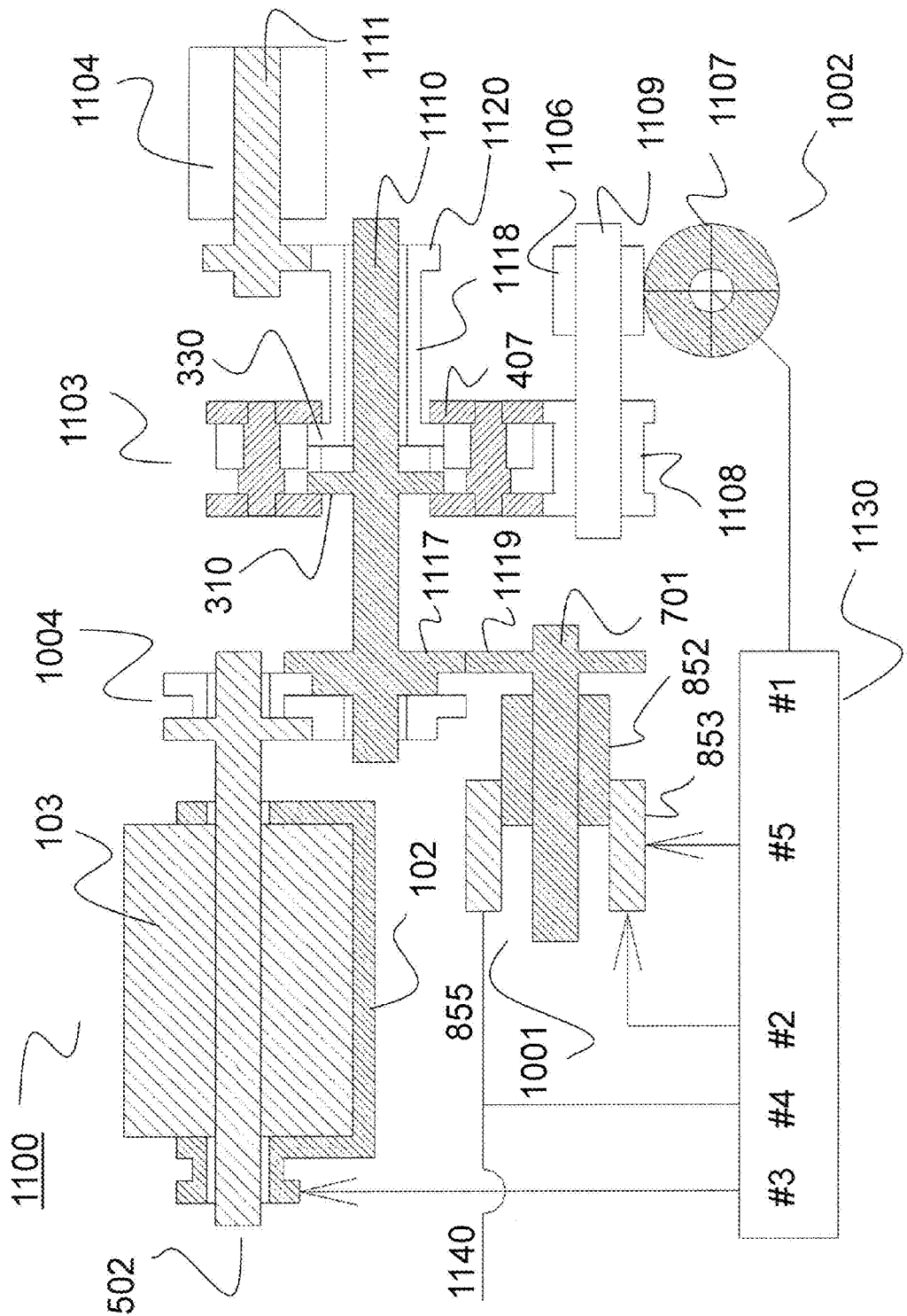
Figure 11: Transgear-controlled Variable Power Generator and Hatch

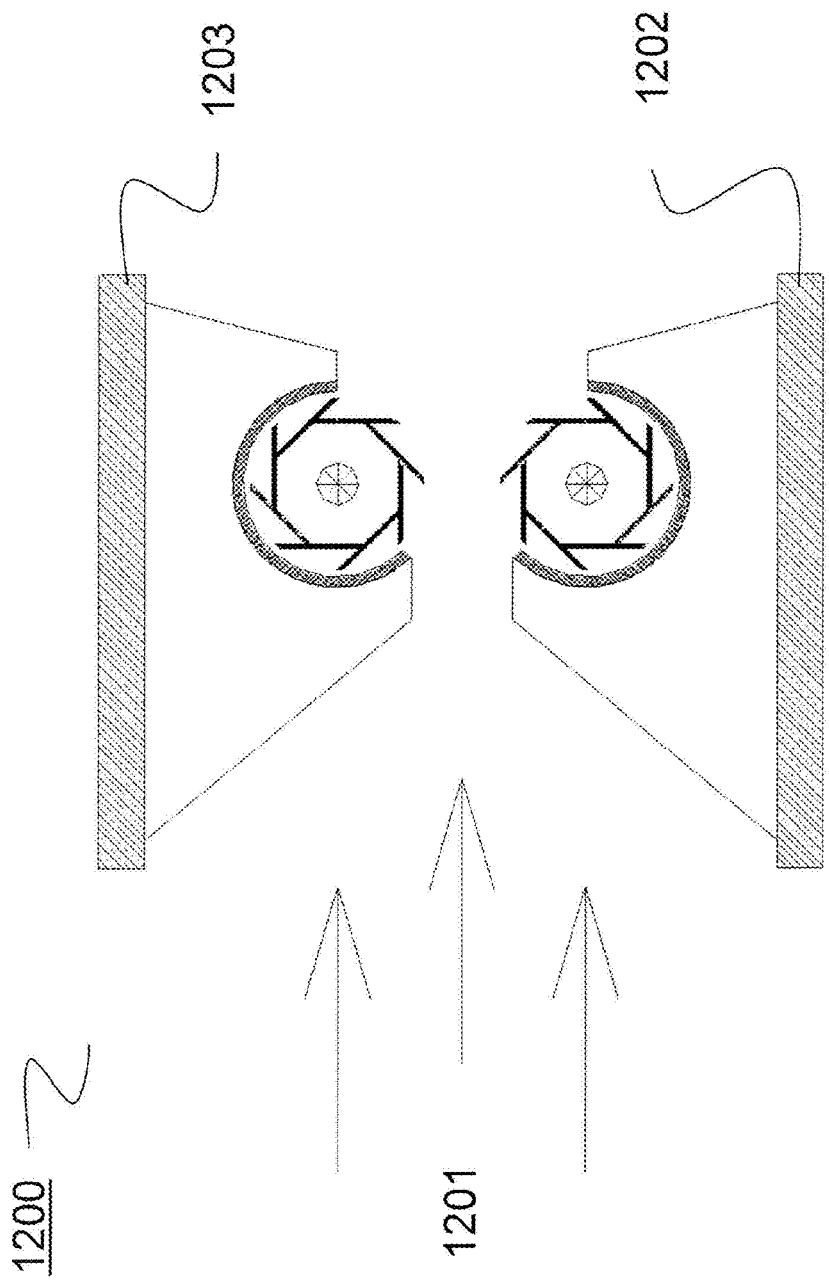
Figure 12. Mounting Options: Bottom Mount and Top Mount

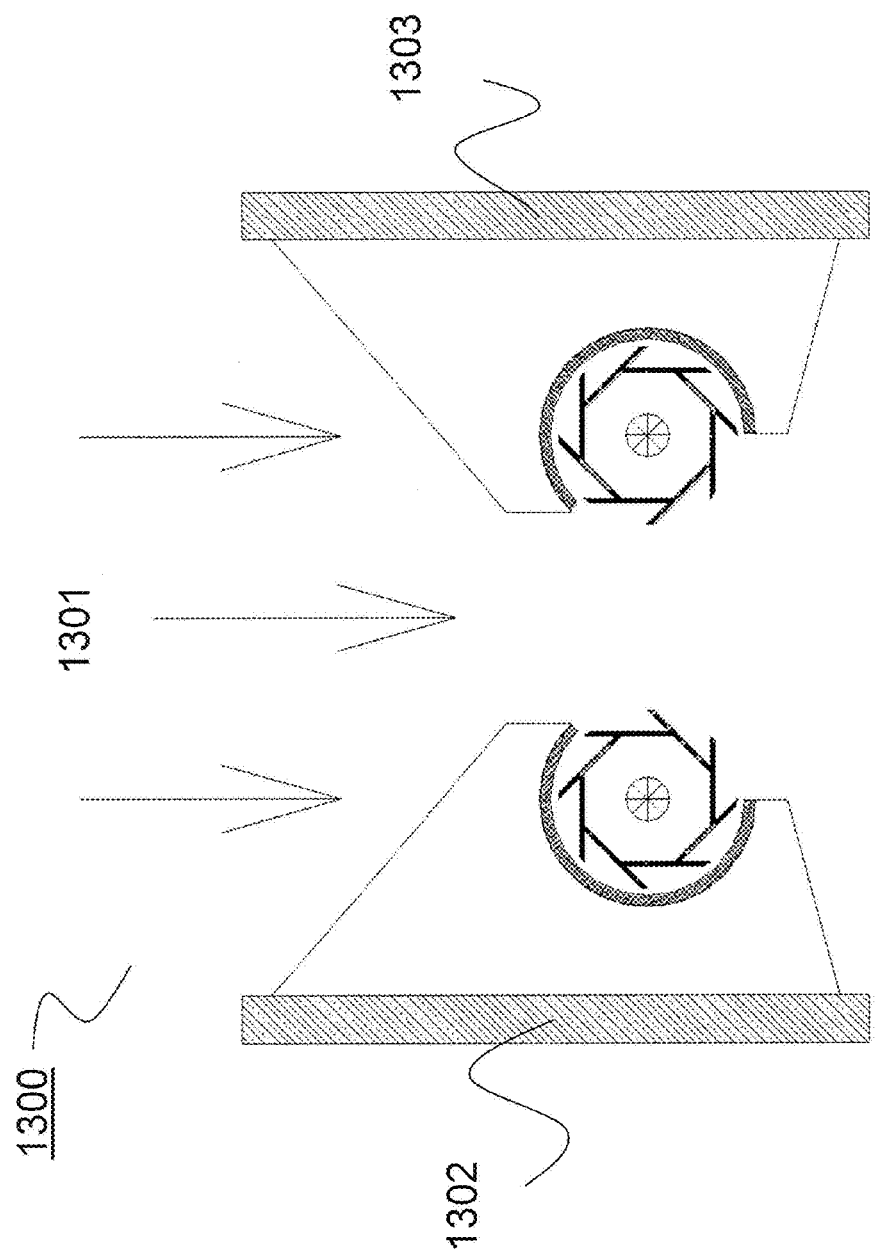
Figure 13. Mounting Options: Side Mount

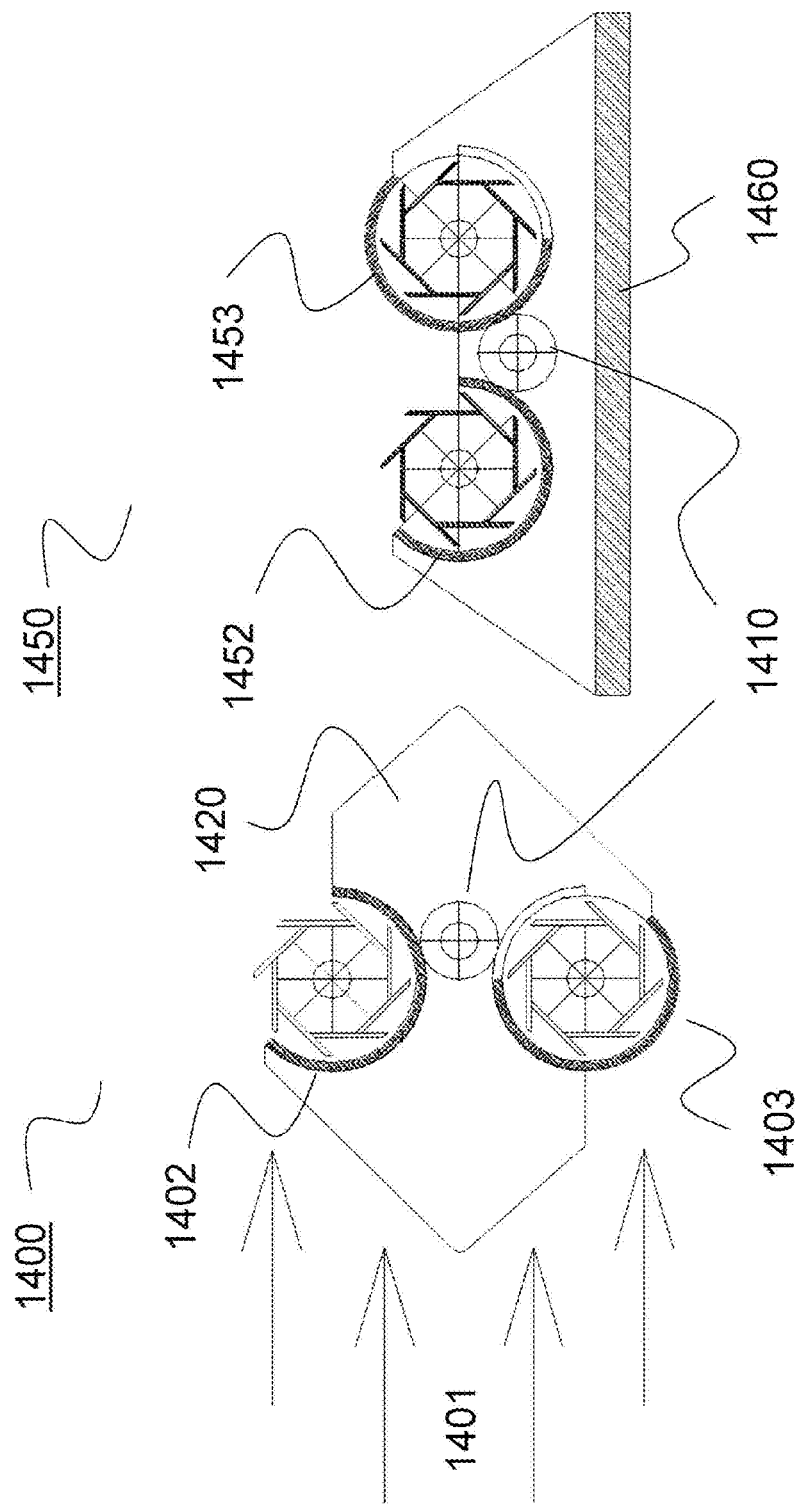
Figure 14A Top View
Figure 14B: Side View

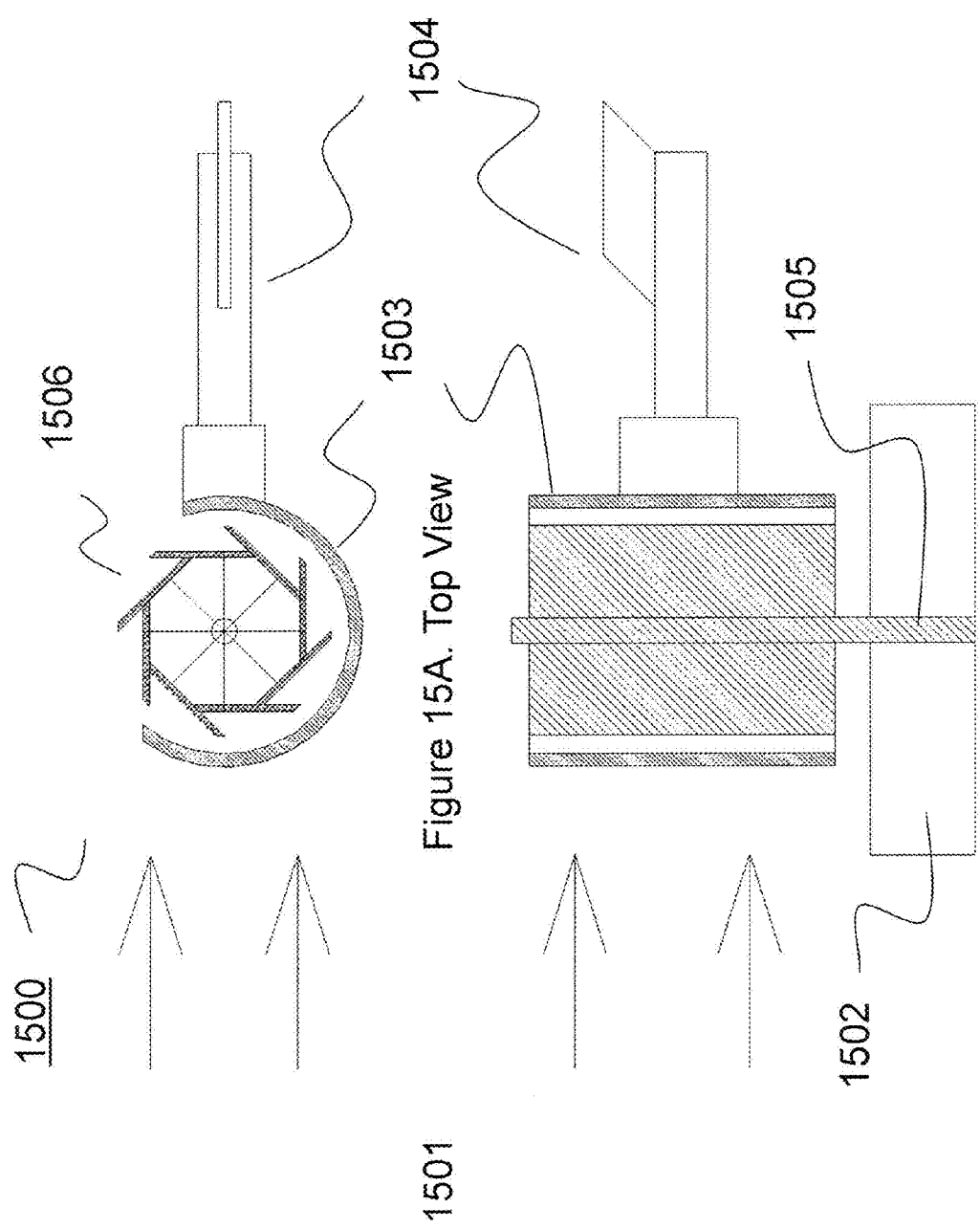

MARINE HYDROKINETIC TURBINE

CROSS-REFERENCE TO RELATED APPLICATIONS

This application is a continuation-in-part of U.S. patent application Ser. No. 14/829,354 filed Aug. 18, 2015 which claims the benefit of priority to U.S. Provisional Patent Application Ser. No. 62/039,096 filed Aug. 19, 2015 and is a continuation-in-part of U.S. patent application Ser. No. 14/255,377 filed Apr. 17, 2014 (now allowed), which is a continuation-in-part of U.S. patent application Ser. No. 13/915,785 filed Jun. 12, 2013, (now U.S. Pat. No. 8,702,552 issued Apr. 22, 2014), which is a divisional of U.S. patent application Ser. No. 13/568,288 filed Aug. 7, 2012 (now U.S. Pat. No. 8,485,933 issued Jul. 16, 2013) which claims the benefit of priority to U.S. Patent Application Ser. No. 61/521,408 filed Aug. 9, 2011, and to U.S. Patent Application Ser. No. 61/523,846 filed Aug. 16, 2011 and U.S. application Ser. No. 13/568,288 filed Aug. 7, 2012 is a continuation-in-part of U.S. patent application Ser. No. 13/425,501, filed on Mar. 21, 2012, (now U.S. Pat. No. 8,641,570 issued Feb. 4, 2014) which is a continuation-in-part of U.S. patent application Ser. No. 13/384,621, entitled "Apparatus and Method for Providing a Constant Output from a Variable Flow Input" filed Jan. 18, 2012, (now U.S. Pat. No. 8,388,481 issued Mar. 5, 2013), being a national stage entry application of PCT US 10/42519 having an international filing date of Jul. 20, 2010, all applications of Kyung Soo Han and being incorporated herein by reference as to their entire contents.

TECHNICAL FIELD

The technical field of the invention relates to providing an efficient marine hydrokinetic turbine, for example, comprising an electro-mechanical speed converter which converts variable rotational speed to constant speed and may utilize a variable power generator (VPG), for example, to control output power frequency, the marine hydrokinetic turbine being useful for generating alternating current electrical energy and, more particularly, to a marine hydrokinetic turbine for efficiently collecting (harnessing) hydrokinetic energy (water energy) using a hatch which may be controlled by Transgear™ gear assemblies as controls and as power take-off (PTO) switches, for example, such as at least one spur/helical gear Transgear assembly having an input, an output, and a control and a marine hydrokinetic turbine utilizing a variable power generator and feedback for regulating output electrical power generated by the turbine to a relatively constant output frequency so that the power may be immediately usable by an electric grid.

BACKGROUND OF THE INVENTION

Hydroelectric energy is one source of so-called renewable energy. About 48% or almost half of all electric energy is produced by steam generation using coal. Natural gas provides about 18% of U.S. electric energy, and nuclear energy now provides about 22% via steam generation. Petroleum, such as oil, is used to produce only about 1% of U.S. electric energy. Coal, natural gas and petroleum are carbon-based and when burned produce emissions which can be costly to mitigate or, if not mitigated, can be dangerous or at least increase the so-called carbon footprint in the earth's atmosphere. The supply of coal, gas and petroleum is also limited. Nuclear energy generation, unless handled with extreme care, is dangerous, and the spent nuclear fuel becomes a hazard to the world.

Consequently, the hope of electrical energy generation for the future is in so-called renewables which include, but are not limited to, the air (wind power), the sun (solar power) and water (hydroelectric and marine hydrokinetic energy) sources. The great Coulee dam, Hoover dam and the Tennessee Valley Authority are exemplary of projects started in the early $20^{th}$ century in the United States. Large hydroelectric generators in such dams on rivers in the United States are now being replaced with more efficient and larger capacity generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created lakes provide water control and recreational use for boating, fishing and the like. Nevertheless, there remains a need for a device that may save the cost of building a dam, permit the marine hydrokinetic generation of electricity and use the inherent flow of a river or the flow of ocean currents, tides and waves.

So-called biomass energy generated from plant and animal material (waste) may amount to approximately 6% of total renewable energy but has similar problems to those of non-renewable carbon-based systems and can cause emissions. While hydro-electric energy amounts to the next greatest renewable source at about 4%, it is believed that more can be done to efficiently utilize the rivers, tides and ocean currents in the United States and near its shores than by hindering the flow of water commerce by the construction of dams.

Other renewable sources include geothermal, wind and solar energy. While these are "clean" sources, to date, their growth has been unimpressive. Only wind energy is supported by the Department of Energy, and wind energy is forecast to grow from 0.55 to 20% of all US energy in approximately 20 years.

Further detail of a conventional turbine is described in WO 1992/14298 published Aug. 20, 1992 and assigned to U.S. Windpower, Inc. A variable speed rotor may turn a gearbox to increase the rotational velocity output of the rotor and blade assembly. For example, a so-called cut-in speed (rotational velocity) of a rotor, for example, may be about six revolutions per minute (when electricity may be generated) and the rotor blade may typically cut-out at about 30 revolutions per minute (a maximum for electricity generation without damage to the turbine) by controlling the pitch of the rotor via a pitch control system during conditions of high wind velocity and to reduce rotor blade noise. Typically, wind speeds over 3 meters/sec are required to cause the large rotor blades to turn at the cut-in speed (rotational velocity). Wind frequency between cut-in and cut-out speeds (velocities) has been measured to vary depending on location, weather patterns and the like. Placement high on a hill or a mountain of a wind turbine, for example, may be preferable to locating the wind turbine at a low point in a valley. Consequently, it may be recognized that there are periods of time when wind turbines do not have sufficient wind speed to operate at all depending on weather conditions, placement and the like.

When wind speed reaches an excess amount, a pitch (and yaw) control system may measure the wind speed and adjust the pitch of rotor blades to pass more wind and so control the rotor blade from turning too fast as well as point the rotor blade into the wind. Yaw control may supplement pitch control to assist in pointing a rotor into the direction of wind flow. Noise from rapid rotor velocity can be abated, for example, by turning the blade parallel to the wind using a wind speed control system to thus maintain the rotational velocity close to a cut-out speed. An anemometer placed at the tail of the known wind turbine may measure wind velocity and provide a control input. The tail of the turbine may be equipped with a rudder or wind vane for pitch or yaw control. Horizontal or vertical stabilizers may be provided for pitch or yaw control. The rudder or wind vane may help point the variable speed rotor into the wind. In general, however, there is a problem with known wind turbine systems that only a portion of the wind energy available at a site of a wind turbine farm may be harnessed resulting in harnessing only a portion of the kinetic energy of the available wind to feed an electric power grid.

Also, a gearbox is known to have a failure rate of approximately 5%. Electronics used in a wind turbine has the highest potential failure rate of 26%. Control units generally exhibit a failure rate of 11%. Sensors and yaw control exhibit approximately a 10% failure rate. The failure rate of a variable frequency converter may be on the order of 26% (electronics) according to an ongoing consortium's study of drive train dynamics at the University of Strathclyde, Glasgow, Scotland. According to published information, the mean time between failures of a 1.5 megawatt wind turbine, for example, may be only two years on average (but the real failure rate is an industrial secret); and the replacement cost may be over $50,000 (for example, $50,000 to $100,000 US) per variable frequency converter. A failure rate of the variable speed generator of a known wind turbine is on the order of 4.5%. Consequently, problems related to known wind turbines relate closely to the failure rate of gearboxes, generators, variable frequency converters and associated electronics and inefficiencies of operation.

A solution to the identified problems is to provide a constant rotational velocity as an input to the constant speed electric generator so that the generator in turn can produce a constant frequency output and deliver the power directly to an electric grid. Transmissions have been developed or are under development by the following entities: IQWind, Fallbrook and Voith Wind (Voith Turbo) to provide a constant output from a variable input. U.S. Pat. No. 7,081,689, (the '689 patent) assigned to Voith Turbo of Germany is exemplary of an overall system control design providing three levels of generator control. Voith provides a so-called power split gear and a hydrodynamic Fottinger speed converter or transformer adapted to be connected between a rotor and gear assembly and a synchronous generator for outputting power to a grid, for example, at 50 Hz (European).

Many of the problems of wind turbines are carried forward into run-of-the-river, tidal, ocean and marine hydrokinetic turbines. There is the same problem of having to convert a variable frequency input to a constant frequency output. On the other hand, the density (mass) of water is much greater and its speed is not as variable as wind speed. Generally, for example, rivers flow in one direction and the major ocean currents do the same. Wave generation, however, in oceans and other large bodies of water varies in magnitude with wind and weather. Ocean shore waves are more predictable and a strong undertow can be useful for electric power generation. Tides are reversible and associated turbines may be limited to one direction of water flow.

A concept for improving wind turbines is use of a mechanical direct drive in which a rotor and a shaft drive a generator. Such a direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, use power converters and so result in reduced down time for repairs at the expense of increased cost due to the direct drive assembly. A speed converter to convert variable speed to constant speed is disclosed in priority U.S. Pat. No. 8,388,481 of Kyung Soo Han. The speed converter is entirely mechanical and so improves upon the high failure rate, reliability and efficiency of known electrical/mechanical systems. Speed converters under development are shown in this and other priority patent applications and are referred to as infinitely variable speed converters.

Traction drive infinitely variable transmissions are known produced by Torotrak and Fallbrook. The Fallbrook device may be described by U.S. Pat. No. 8,133,149. A 2004 report, NREL/TP-500-36371, concluded that the Fallbrook device is not scalable. Further speed converters are described by FIGS. 10 and 11 of priority U.S. Pat. No. 8,641,570 of Differential Dynamics Corp. (also known as DDMotion). The DDMotion speed converters are differentiated from those of Torotrak and Fallbrook by their gear drives (no toroids, pulleys or belts) and that they are scalable.

A turbine was produced by Hydrovolts, Inc. The apparatus may comprise a waterwheel and may comprise a gear and belt drive inside which may, because of the belt, be susceptible to slippage. At their web site, a 15 kW waterfall turbine is described for use at a waterfall such as at spillways or outflows in industrial plants. Hydrovolts also produces a 12 kW zero-head canal turbine that allegedly can capture the energy in moving water. Reference may be made to U.S. Published Patent Application 2010/0237626 of Hammer published Sep. 23, 2010, which appears to comprise a waterwheel construction. Hydrovolts' rotating (hinged) blades may control some of the water flow speed, but it is urged that the rotating blades may be susceptible to damage.

A river turbine is known which may be attributed to Free Flow Power Corp. and may have been lowered to the bottom of the Mississippi River or attached to a piling. It is believed that such a device may be very similar to a turbine engine of an airplane but below water level and the water, at velocity, drives a turbine propeller. Due to lowering prices of natural gas, the project became economically unviable (according to their press release in 2012).

It is generally known in the art to utilize devices that look much like wind turbines to capture water energy. A tidal and/or river current turbine is known from FIG. 1 of U.S. Pub. Patent App. 2009/0041584 published Feb. 12, 2009. The diagram provides the labels, showing direction of water flow "A" (from right to left). Note that the turbine rotates on a pole so that rotor blade 150 captures the water as it passes. This device may be available from Verdant Power. It is respectfully submitted that Verdant Power may currently be strengthening their blades and adding pitch control.

A rotating ring device including a rotating ring is known which is available from Oceana Energy Company. FIG. 1 of U.S. Published Patent Application 2012/0211990 of Aug. 23, 2012 of Oceana Energy allegedly comprises hydrofoils both external and internal to the rotating ring.

Perhaps the most like a wind turbine in appearance is the known tidal energy turbine of ScottishPower Renewables, a division of Iberdrola. According to press releases, this tidal device with its propeller (rotor blades) is capable of generating approximately 10 MW of power as an "array" perhaps of twelve or more such devices at less than 1 MW each.

Devices are also known for harnessing the power in water waves such as ocean waves. Such a device is known and available from Pelamis Wave Power. FIG. 1 of Pelamis's U.S. Pub. Patent Application 2013/0239566 of Sep. 19, 2013 shows a Pelamis device 10 floating in the ocean, the device 10 may comprise a plurality of hinged sections 12-A, 12-B, 12-C, 12-D and 12E. The device wiggles and generates power in the direction of a wave from left to right. As the wave passes through the hinged sections, the sections 12A through 12E move up and down with the height of the wave. The wave thus creates movement which may be used to generate electricity. It may be said that the higher the wave, the greater the movement; the calmer the seas, the less the movement.

Most maps of the United States show the major rivers which include the Ohio, the Mississippi, the Missouri, the Snake River and the Pecos and Brazos Rivers of Texas. As can be seen from such a map, there is a great potential to harness the water energy of these rivers in the United States and to power, for example, the entire area covered by the Mississippi River and its tributaries including the Missouri, the Platte and the Red Rivers. Using dams across these rivers to generate electricity would be costly and hinder river traffic. It may be that only Free Flow Power has developed a device for use on such a river as the Mississippi (but Free Flow Power abandoned the Mississippi project in 2012).

Similarly, a map of the world shows the major rivers of the world, further highlighting the potential to harness water energy in rivers world-wide. Also, ocean current maps are shown, for example, showing the Gulfstream. Proximate to the United States, the strong ocean current of the Gulfstream is known to flow northward along the east coast of the United States. On the west coast of the United States, there is known a southward current initiating as the north Pacific drift and, as it passes California, is referred to as the California Coastal current. Other important world currents include and are not limited to the Peru/East Australian current, the Brazilian current/Benguela current, the west wind drift, the West Australian current, the Kuroshio current and the North Atlantic drift. These strong currents are known and have the potential to generate a considerable amount of power but are presently not used for electricity or power generation. (Predictable ocean tides cause water to flow upstream in ocean tributaries at high tide and downstream in ocean tributaries at low tide and may be more widely used for electric power generation.)

A typical hydroelectric power plant is mounted within a dam of a river. A first step in harnessing water energy in this means is to build the dam to create a pressure head that is proportional to the depth of the water backed up by the dam. The backed-up water is represented by a reservoir or lake. At the base of the dam, there may be intake gates which allow water that has been compressed by the head to flow through a penstock to a powerhouse which is one of many such powerhouses that may be constructed along the width of a large dam. One powerhouse may comprise a generator and a turbine which outputs electric power to long distance power lines. Once the water passes through the turbine, it is returned to the river downstream.

A variable torque generator has been described in priority U.S. Pat. Nos. 8,338,481; 8,485,933; and 8,702,552 as well as priority PCT/US2010/042519 published as WO2011/011358. The variable torque generator has one of an axially moveable rotor and stator with respect to its stationary or moveable counterpart stator or rotor so as to vary the amount of overlap by the stator with respect to the rotor from a minimum when the stator is displaced from the rotor to a maximum value when the stator and rotor are proximate to or overlap one another.

In particular, there is described in, for example, WO2011/011358 or U.S. Pat. No. 8,338,481 (the U.S. '481 patent), the concept of measuring torque/rpm on an output shaft of a system such as a wind or river/tidal/ocean wave/ocean current turbine (which may be referred to herein as a marine hydrokinetic (MHK) turbine) for providing a constant output from a variable flow input. The measured torque/rpm value may be compared with a torque/rpm value stored in a memory and, if the measured torque/rpm is high in comparison, then, the moveable rotor or stator of a variable torque generator may be moved axially to a position more in keeping with the high measured torque/rpm value, i.e. such that the stator is moved away from the rotor axially under motor control through a feedback loop. When the measured torque/rpm is low in comparison with an expected value, the moveable rotor or stator may be moved axially toward one another to match a low value of torque/rpm so that the speed of the output shaft may increase and vice versa. This variable torque generator process continues so as to maintain a relationship between speed of input (such as wind or river/tide/ocean wave/ocean current) to match a desired rotational speed of output shaft and to maintain output shaft speed, for example, if used as an electric power generator, to produce 60 Hz U.S. electric frequency or in Europe 50 Hz European frequency electric power.

In either the priority '481 U.S. patent or the WO 2011/011358 printed publication priority documents, FIG. 8 shows the concept of an infinitely variable torque generator, meaning that the one of the moveable rotor or the stator may be moved, for example, by a servo motor, not shown, to any position of proximity to or distance from one another or such that their respective magnetic flux fields are located far away from one another so as to not couple with one another or to couple with one another, for example, to have an effect to cause a coupling of rotor and stator and a magnetic force field tending to cause the rotor to be stationary with the stator or move with the stator. In FIG. 10, the rotor and stator of the variable torque generator are shown such that the rotor 810 is directly coupled to the shaft 820. "When the stator parts 830(a) and 830(b) are moved away from rotor 810, a minimum input torque results. The operation of a control may be as follows via measuring a torque value stored in memory proximate to the maximum torque that a given rotor shaft 820 may receive (a maximum allowable torque value), the stator parts 830(a) and 830(b) may be moved by a motor (not shown) to be in removed torque position or a position in between maximum and minimum torque positions whereby a close-to-maximum torque position may be achieved in relation to the measured torque and the maximum allowable torque(/rpm) value or value stored in memory."

There remains a need in the art to provide applications of such a variable torque/power generator assembly as well as a spur/helical gear assembly (Transgear™ gear assembly) in connection with the generation of electrical energy/power (variable power generator, VPG) from renewable sources such as wind and river/tide/ocean wave/ocean current, that is, a marine hydrokinetic turbine electric power generator among other possible applications in wind turbines for generating electric power at constant alternating current frequency for a power grid.

SUMMARY OF THE PREFERRED EMBODIMENTS

Embodiments of a variable power generator (VPG) associated with wind and river/tide/ocean wave/ocean current, marine hydrokinetic (MHK) turbine equipment or other application comprise a VTG/VPG Extension to variable torque motors (VTM), also referred to herein as variable power motors (VPM), wherein there may be an adjustment of the relative axial overlap between the rotor and stator to control speed and torque independently. A suggested application is in the potential application of VPG in wind and river/tidal/ocean wave/ocean current (MHK) turbines along with the use of spur/helical gear assemblies of sun gears, sets of planetary gears and carrier gears and brackets referred to herein as Transgear™ gear assemblies.

In wind and MHK turbines, a speed converter is used for the purposes of adjusting the speed of the input which may be slow or fast depending on the rate of wind or river velocity with respect to a desired constant output speed (rotational velocity or electric power frequency) for generating electric power to be fed to a power grid. The embodiment considered provides mechanical synchronization of variable input to constant output. In particular, it is suggested that there be an adjustment of the relative angular (radial) relationship between the rotor and stator in addition to the concept of adjusting the (axial) position lengthwise of a moveable rotor or stator in a VTG or VPG for variable torque with input velocity and desired output frequency. This concept is especially useful for mechanical speed converters for synching the phase angle of variable input with, for example, a desired constant output velocity (convertible to electric power frequency, for example, at 60 Hz US and 50 Hz European).

A further practical application of VPG is to provide a reciprocating input to a fixed power generator (FPG) or a variable power generator (VPG) for generating electricity with a reciprocating rotor. This concept eliminates the need for Sprags from the speed converter described in the priority patent applications and patents, and reduces cost, weight, size, and potential validation time.

A further practical application of VPG is to provide reactive VTG with respect to waterwheel control in a river/tidal/ocean wave/ocean current, marine hydrokinetic (MHK) turbine. In this embodiment, the VPG may increase torque to the generator in MHK or wind turbines (or any variable load) for control of a waterwheel (or propeller/blades) or Hatch of such a MHK turbine. In a MHK turbine, the reactive torque control may be applied to control waterwheel speed until reactive torque control reaches a designed maximum and then Hatch control may be used for further waterwheel speed control with respect to desired output electrical power frequency.

A variable torque/power generator useful in all embodiments for controlling torque/rpm from a maximum to a minimum is shown in perspective view in FIG. 7 (exaggerated perspective view to show the movability) and in FIG. 8A (fixed rotor and stator with maximum torque), FIG. 8B (showing rotor and stator displaced from one another for minimum overlap) and FIG. 8C (showing rotor and stator coupled magnetically or electromagnetically for maximum overlap). The utilization of a variable power generator as shown in FIG. 7 has been validated by the University of Maryland, Baltimore County, as a useful control device for controlling output shaft rotational velocity at a constant value with respect to a variable input shaft rotational velocity. For steady flowing streams and rivers, without much flow rate variation, a constant speed output can be easily produced by compensating the input. In wind turbine applications, considerable more control is required due to the more extreme variation in wind velocity from practically a calm wind to a high velocity storm wind. As shown in FIG. 8B or 8C, a constant speed, variable torque/power generator 850, may comprise rotor shaft 701 on which may be displaced a moveable stator 853 to positions of minimum overlap 860 with rotor 852 (FIG. 8B) to medium overlap (not shown) and maximum overlap 861 with rotor 852 in FIG. 8C and any positions in between. (There may be an infinite number of positions between minimum overlap 860 and maximum overlap 861 but minimum and maximum positions are shown by way of example). Shaft 701/rotor 852 may be connected to a pump, variable transformer, engine, generator or other device or wind or river/tidal/ocean wave/ocean current (MHK) turbine as discussed above. Note that in an alternative embodiment a rotor may be moveable with respect to the stator if needed to achieve minimum, medium and maximum torque (and any position in between). These variable torque/power generators (VTG's or VPG's) may be added to an input compensating IVMC (Infinitely Variable Motion Converter) with a speed converter, for example, to output electric power to a grid at constant frequency.

In MHK turbines, for example, the VPG may be used to advantage regulating output shaft rotational velocity to a constant value. Per FIG. 10, a VPG output shaft 1010 may have its output rotational velocity monitored by, for example, a tachometer or other rotational speed detector as an integral part of a control box 1006 and used to regulate the VPG comprising shaft 1010/rotor 852 and stator 853 having an electric power output 1005 regulated to be alternating current at constant voltage and constant frequency. Control box 1006 actuates servo motor 1007, for example, worm 1008 attached to the motor shaft 1011 and worm gear 1009 or other equivalent shaft and gear arrangement to axially adjust the stator 853 position with the rotor 852 without a back flow. Electrical output 1005 of variable current depending on water flow velocity will be connected to the power grid at a desired electric power frequency (such as 60 Hz US and 50 Hz European) and constant voltage.

Referring now to FIG. 3, FIGS. 4A, 4B and 4C, there is shown a typical spur/helical gear assembly 300, 400 referred to herein generally as a Transgear gear assembly. Such assemblies are also shown in FIG. 5 (Hatch control) and FIG. 6 (Hatch control and speed control) and for use in power take-off controls. Electronics of determining rotational velocity and deciding Hatch control are described in connection with a description of a special purpose computer processor and memory control box 1006 of FIG. 10 and 1130 of FIG. 11 or alternatively, for example, an application specific integrated circuit.

Now referring to FIG. 11, there is shown a three variable spur/helical Transgear™ gear assembly controlled variable power generator and Hatch. The Transgear assembly 1106 may provide control of a variable power generator 1001 comprising output shaft 701, rotor 852 and stator 853. Input to input shaft 502 is rotating VPG shaft 701 via gear box controlled output shaft 1110 and under control of Transgear assembly 1106 and constant speed motor 1104. Left sun gear 310 of Transgear assembly 1103 is connected to control shaft 1110 having integral or attached gear 1117 meshed with generator output shaft 701 via meshed gear 1119. The rotational speed of input shaft 502 is increased and reflected in the rotational velocity of output shaft 1110 via the gear box 1004. Motor 1104 preferably rotates at a constant speed and the motor shaft 1111 is rotating right sun gear 330 of Transgear assembly 1103 via sleeve 1118 and gear 1120 integral with or attached to sleeve 1118. The rpm (rotational speed) variation of left sun gear 310 and right sun gear 330 of Transgear assembly 1103 will adjust the stator 853 displacement with respect to rotor 852 through, for example, a pair of worm and worm gear 1002, worm 1106 and worm gear 1107. Input waterwheel shaft 502 rotational velocity may be variable and VPG output shaft 701 rotational velocity held constant via control motor 1104 input to Transgear assembly 1103.

With reference to FIGS. 9A and 9B, the synchronization of rotor and stator of a VPG may be out of synch as seen in FIG. 9B by an angle 904. The angle may be adjusted by radially moving rotor 702 with respect to stator 703.

FIGS. 1 through 11 are provided by way of example to show the application of a VPG/Hatch in an MHK turbine, for example, for control of a Hatch, output speed or electric current frequency to be relatively constant in comparison to variable water flow rates. The same principles may be applied to wind turbines to obtain constant output rotational velocity or electric current frequency and to adjust propeller pitch in comparison to variable wind velocities.

FIGS. 12 through 15A and 15B show embodiments of an MHK turbine with a Hatch and waterwheel in various arrangements or applications of MHK turbines for use in rivers, tidal streams, ocean tides and currents and the like so that the MHK turbine may be used to advantage whatever the direction of water flow may be. Embodiments include bottom mount, top (for example, float) mount, side mount and a mount with a water vane to swivel the MHK turbine with variable direction of water flow.

These and other embodiments will be described with respect to the drawings, a brief description of which follows.

BRIEF DESCRIPTION OF THE DRAWINGS

FIG. 1 provides a perspective view of an exemplary bottom-mounted marine hydro-kinetic (MHK) turbine 100, for example, located so as to receive water flow and generate electricity.

FIG. 2 provides a side view of an embodiment of an MHK turbine 200 similar to the embodiment of FIG. 1 mounted, for example, to a river bed platform 207 having a sloping block 101 for receiving water flow from the left, a flat or horizontal planar top 202 and a Hatch 210, 220, 230 (three positions shown) for covering a waterwheel 103 depending on the amount of water flow.

FIG. 3 provides a perspective view of a basic spur gear three (to N) variable Transgear™ gear assembly 300 having a shaft/sheath/sleeve 305 integral with or attached to a left sun gear 310 (which may be a first assigned variable, input, output or control). A second assignable variable may be the carrier gears 320. A third assignable variable may be the right sun gear 330.

FIG. 4A shows a left side view, FIG. 4B shows a front view and FIG. 4C shows a right side view of a three variable basic spur or helical Transgear™ gear assembly 400 useful in FIGS. 5, 6 and 11.

FIG. 5 shows a top view of an MHK turbine 500 showing hatch control and Transgear assemblies.

FIG. 6 shows a complete MHK turbine 600 with a gearbox 617 and generator 619 controlled by Transgear assemblies.

FIG. 7 is a perspective view (an exaggerated view to emphasize the variable overlap of rotor and stator) of a variable power generator (VPG) 700 showing a shaft 701 which may integral to or fixedly attached to a rotor 702 displaced at a minimum/maximum overlap (or any position in between) or torque position from a stator 703 (minimum overlap shown), a means of moving the rotor 702 to a maximum position being, for example, a motor (not shown) such as a servo motor under feedback control to match desired torque with desired shaft 701 rotational velocity.

FIGS. 8A, 8B and 8C each provide an overview mechanical diagram of a Variable Torque Generator (VTG) also called a variable power generator or VPG where FIG. 8A represents a fixed overlap embodiment $00 with no adjustability between shaft 701, rotor 702 and stator 703. FIG. 8B shows a minimum overlap variable power generator 850 having a minimum overlap 860 between a shaft 701/rotor 852 and a stator 853; and FIG. 8C shows a maximum overlap variable power generator having a maximum overlap 861 (maximum torque/power) between a rotor 852 and a stator 853.

FIG. 9A, front view, and FIG. 9B, side view, show an example in cross-sectional view of how to achieve synchronization with a VPG (FIG. 9B) by adjusting the angle of displacement of stator 904 with respect to a rotor 702 (adjustment angle 904) so as to better achieve synchronization between a wind or water flow input with a desired synchronized phase angle of power output to a power grid.

FIG. 10 provides an overall schematic and mechanical diagram of an MHK turbine 1000 having an electronically-controlled variable power generator (VPG) 852/853 for use, for example, in a wind or MHK turbine such as MHK turbine 1000 for controlling variable input flow rates to achieve a constant output rotational velocity or electric current frequency at output 1005.

FIG. 11 shows a mechanical and an electrical diagram of a Transgear-controlled Variable Power Generator and Hatch 1100 having a control box 1130.

FIGS. 10 and 11 further show how to combine details of an MHK turbine electric power generator control following principles introduced with reference to FIGS. 1, 3, 7 and following FIGS. 12-15A and 15B.

FIGS. 12-15A and 15B show embodiments of an MHK turbine with a Hatch and waterwheel in various arrangements or applications of MHK turbines for use in rivers, tidal streams, ocean tides and currents and the like so that the MHK turbine may be used to advantage whatever the direction of water flow may be. Embodiments include bottom mount, top (for example, float) mount, side mount and a mount with a water vane to swivel the MHK turbine with variable direction of water flow.

FIG. 12 shows first and second arrangements 1200 for mounting an MHK turbine for receiving water flow 1201 from the left as a bottom mount 1202 (for example, on a river bottom platform) and as a top mount 1203 (for example, from a floating platform, a boat or the bottom of a dock).

FIG. 13 shows a top view of first and second arrangements 1300 of a side mount of an MHK turbine for receiving water flow 1301 from the top as a right side mount 1302 and a left side mount 1303 (these turbines may be mounted to the left and right sides of a bridge piling, a dock piling, an underwater wall confining, for example, a canal or stream).

FIG. 14A shows a top view of an arrangement 1400, and FIG. 14B shows a side view of an arrangement 1450 of two MHK turbines mounted together, for example, on a pole or surrounding a bridge piling or dock piling whereby if the water flow 1401 is from left to right, then, turbine 1402 or 1452 generates power and if the water flow is from right to left, then, turbine 1403 or 1453 generates power.

FIG. 15A shows a top view of an MHK turbine swivel-mounted to a central axis of the MHK turbine 1503 having a water vane so that the water flow 1501 may change direction and the facing of the MHK turbine 1503 into the water flow 1501 is consistent; and FIG. 15B shows a side view of an MHK turbine swivel-mounted to the central axis of the MHK turbine 1502, for example, mounted at the bottom of a river or tidal stream (or mounted from the top, not shown, as per FIG. 12).

The principles of application of a VPG and a Transgear assembly for controlling input with respect to output and providing Hatch control in an MHK turbine will now be further described in the detailed description of the drawings which follows.

DETAILED DESCRIPTION

In the figures of the present embodiments of the invention, an effort has been made to follow a convention such that the first reference number such as 1XX indicates figure number where the element first appears, for example, Hatch 102 first appearing in FIG. 1.

Referring now to FIG. 1, FIG. 1 provides a corresponding perspective view of an exemplary MHK turbine 100, for example, located so as to receive water flow and generate electricity. The MHK turbine 100 may have a sloped block 101 (shown in FIG. 1) for channeling the water flow toward a Hatch 102 which is shown in an almost open position with respect to a waterwheel 103. The waterwheel 103 will turn more freely if the Hatch 102 is open and exposes the waterwheel 103 to the entire water flow. The Hatch 102 has an associated Hatch control as described in FIGS. 5, 6 and 11 and pending patent applications and issued patents and generator control wherein a waterwheel 103 is turned by water flow in proportion to velocity (more water flow, higher waterwheel rotational velocity). The Hatch control may open/close the Hatch 102 to an infinite number of positions over the waterwheel 103 so that maximum or appropriate water flow will drive the waterwheel 103, and a generator 105 driven by a gearbox and mechanical controls 104 produces output power at a desired constant frequency to a power grid regardless of input water flow rates. The output shaft or any shaft coupled to the waterwheel may comprise the VTG/VPG of FIG. 8B or 8C (briefly described below). The rotor 852 and stator 853 may be fixed or variably positioned with respect to the rotor 852 to regulate the output shaft 701 driving an output electric generator to a constant output velocity such as 60 Hz or 50 Hz for power generation having constant voltage but current variable with amount of water flow and the turning velocity of the input waterwheel 103. FIG. 1 provides a better view of how an MHK turbine may be placed bottom-mounted at the bottom of a river or stream or on the ocean floor or platform to receive ocean current. As shown in recently allowed patent application, a run-of-river turbine also known as an MHK turbine is described in priority U.S. patent application Ser. No. 14/255, 377 of Kyung Soo Han filed Apr. 17, 2014, now allowed. The MHK turbine 100 may be allowed to rotate with tidal flow so as to always face the direction of tidal flow (see, for example, FIG. 14A, FIG. 14B or FIGS. 15A and 15B). A ramp called ramp block 101 receives water flow, and the water flow may be channeled over a horizontal plane to hatch 102 shown in a mostly open position to allow the water flow to turn waterwheel 103. A gear box and controls 104 (which may comprise a special purpose programmed controlled processor) regulates the variable rotational velocity of waterwheel 103 to a desired constant rotational velocity of output shaft 105 for driving an electric generator for feeding power to an electric power grid (not shown). As described below, this MHK turbine may be controlled in the manner described with reference to FIGS. 5, 6, 9A, 9B, 10 and 11.

Referring to FIG. 2, FIG. 2 provides a side view of an embodiment of an MHK turbine 200 similar to the embodiment of FIG. 1 mounted, for example, to a river bed platform 207 having a sloping block 101 for receiving water flow from the left, a flat or horizontal planar top 202 and a Hatch 210, 220, 230 (three positions shown but infinite positions possible) for covering a waterwheel 103 depending on the amount of water flow. Three hatch positions 210, 220, 230 (although an infinite number of hatch positions are possible). Hatch position 210 permits the most water to be received by waterwheel 103. In constant flowing rivers and streams, for example, Hatch position 210 may stay in an open position. A medium Hatch closure is shown as hatch position 220. The water flow will be drawn up over the hatch and still turn the waterwheel 103, for example, at constant velocity in a fast current or storm condition. In a severe storm condition, a maximum closure position 230 may be used to fully protect the waterwheel from damage by floating debris or extreme water current which may damage the waterwheel. This maximum Hatch position 230 may still permit the waterwheel to turn and operate to produce electric power but it's desirable to lock the waterwheel during the installation or maintenance.

Referring to FIG. 3, FIG. 3 provides a perspective view of a basic spur gear three variable Transgear™ gear assembly 300 having a sheath/sleeve 305 integral with or attached to a left sun gear 310 (which may be a first assigned variable, input, output or control). In this embodiment the gear assembly 300 may be five gears wide. On the other hand, if carrier gears are carrier discs, the assembly 300 may be three gears wide (not shown). A first assignable variable may be the left sun gear 310. A second assignable variable may be the carrier gears 320. A third assignable variable may be the right sun gear 330. There are also shown a set (pairs) of two planetary gears 340, the lower pair being indicated as Planetary Gears 340. Left Sun Gear (Variable #1) 310, Carrier Gears (Variable #2) 320 and Right Sun Gear (Variable #3) 330 and planetary gears are shown as spur gear Transgear but may comprise helical gears in alternative embodiments.

Referring to FIGS. 4A, 4B and 4C, FIG. 4A shows a left side view, FIG. 4B shows a front view, and FIG. 4C shows a right side view of a three variable basic spur or helical Transgear™ gear assembly useful in FIGS. 5, 6 and 11. The depicted three variable assembly has a mechanical input, an output and a control variable. The three variables may be a first sleeve 310 (left sun gear) and a second sleeve 330 (right sun gear), and carrier (assembly of carrier brackets 406 and 407, planetary gear pairs 403A, 403B, 404A, 404B, and pins 409A, 409B, 410A, 410B). The first and second sleeves 310, 330 having sun gears which mesh with spur/helical pairs of planetary gears. As is taught in priority patent applications and patents, the sun gears may have variable diameters as may the planetary gears, and the planetary gears may be double or single gears. For example, with respect to three assignable variables of a Transgear assembly, first sleeve 310 may be an input shaft (input variable); second sleeve 330 may be a control (control variable) and carrier (or carrier assembly) may be the output (output variable). This three variable embodiment as discussed in pending U.S. patent application Ser. No. 14/668,315, of Kyung Soo Han filed Mar. 25, 2015 may have different diameter sun gears for sleeves 402, 405 and different diameter planetary gears which may be single gears or double gears. The spur gear assembly is also shown as FIG. 1 in U.S. Pat. No. 8,986,149.

Referring now to FIG. 5, FIG. 5 shows a top cross-sectional view of an MHK turbine (not to scale) and is a mechanical diagram of a Hatch control of Hatch 102 over waterwheel 103 with two sets of Transgear gear assemblies. Waterwheel shaft 502 is extended and two gears 504 and 505 are attached to the shaft 502. Control of the first Transgear gear assembly is carrier 508 and control of the second Transgear gear assembly is sun gear 510. The output of the two Transgear assemblies is an assembly of carrier 509/503 and sun gear 506. The output controls the Hatch 102 through gears 509/513, worm 514, worm gear 516, bevel and spur/helical gear 517, and spur/helical gears 518/519.

FIG. 5 provides a mechanical diagram (cross-section of moving components) of a hatch control embodiment 500 in top view of a water wheel 103 not showing protector ribs or flaps that can move but with a Hatch 102 reaching into the engagement with Transgear assemblies via Hatch control gear 519. Idle gear 518 may engage Hatch gear 519. The Hatch 102 (and moving or not moving ribs) may be controlled using Transgear technology. A second (shown lower in FIG. 5) Transgear assembly may be held to close the Hatch and a first Transgear assembly (above) may be held to open the Hatch within embodiment 500 depending on actuation via the worm and worm gear assembly 514/516 where the Hatch 102 is shown connected to the first and second Transgear assemblies and regulated by the bevel gear 517 of the worm and worm gear assembly 514, 516 (the worm 514 connected to or integral with shaft 511). PTO Output provided by the bevel gear 517 is connected to Hatch control gear 519 via gear 518. The Transgear assemblies could also regulate protector ribs, not shown, as easily as Hatch 102 to provide a rib and Hatch controlled constant rpm output of the water wheel shaft 502.

Referring now to FIG. 6, FIG. 6 shows an embodiment (top view, cross-section, not to scale) of a MHK turbine 600 with a block (not shown), a Hatch 102, and a waterwheel 103 and that may be Hatch controlled rough tuning 508/510 and a fine tuning 611/612. Controlled outputs will be sent to a gearbox 617 and a constant speed generator 619. Shaft 502 of waterwheel 103 passes through Hatch control 508, 510 and 611, 612. Transgear gear assembly 614 accumulates the outputs of a first and second Transgear assembly pairs and rotates bevel, worm, worm gear control of the Hatch 102 as discussed above. Thus, the shaft 502 powers to fine tuning the RPM of shaft 502 via assemblies 611, 612. Then, the Transgear assembly 614 proceeds to accumulator for accumulating two inputs, the Hatch controlled and finely tuned rpm to be applied to the gearbox 617. The rotational output from the gearbox 617 is transferred to the constant speed generator 619 via the gearbox 616, 617 and from there to an electric power grid via an extension of shaft 618 (or other power storage system).

Now referring to FIG. 7, there is shown the basic concept of a variable torque generator (VTG) or variable power generator (VPG) useful in all embodiments for controlling torque from a maximum to a minimum over a continuous range. For steady flowing streams (or steady wind conditions), without much flow rate variation, a constant speed output can be easily produced by compensating the input. As shown in FIG. 7, a constant speed, variable torque generator (VTG) or variable power generator (VPG) in electric power generation applications 100, comprises rotor shaft 701 which is shown displaced axially with integral rotor 702 to a position of minimum overlap with stator 703. Either stator 703 may be moved to overlap rotor 702 or rotor 702 may be moved to overlap stator 703 in alternative embodiments. In the present embodiment in the following figures, for example, the stator 703 may be moved (due to a simpler presentation) to a maximum power generation position by moving the stator from left to right to be contained within rotor 702. This embodiment was verified by the University of Maryland, Baltimore County to provide control of a variable rotational input velocity to match a constant output rotational shaft velocity, for example, by using a servo motor, for example, to move stator from maximum displacement (for example, high winds or extreme water flows) to minimum displacement (perfect overlapping) (for example, low winds or slow speed water flow).

Referring now to FIGS. 8A, 8B, 8C, the disclosed VTG/VPG device and generator is capable of infinitely varying the required rotor torque by adjusting the relative overlap between the rotor and stator, one of which is associated with a shaft. FIG. 8A shows a fixed overlap and a fixed power generator. On the other hand, a variable torque/power generator per FIGS. 8B and 8C (VTG/VPG) can control torque independently of other controls. According to a concept of an embodiment of the present invention, generator torque controls for wind and MHK turbines may be controlled via VTG/VPG. Advantages include: the cut-in speed can be reduced close to zero and harness lower speed energy and rated speed can be increased to close to cut-out speed (the rated power of a generator can be increased when the rated speed increases). The VTG/VPG of FIG. 8B, 8C may be applied in an electric vehicle or an internal combustion engine as described in pending U.S. patent application Ser. No. 14/225,658 filed Mar. 26, 2014, now allowed (and published as U.S. Published Patent Application 2014/02960616 on Oct. 2, 2014).

Referring now to FIGS. 9A and 9B, there is shown a VTG/VPG for synchronization. A solution to synchronization of rotor and stator of a leading or lagging VTG/VPG is shown in FIGS. 9A and 9B wherein it is shown that an adjustment angle 904 is provided in cross-sectional view whereby a small adjustment angle 904 is provided for the stator 703 with respect to the rotor 702 (if one leads or lags the other) that may be controlled to assist in synchronization of input and output frequency. The advantage of the small synchronization adjustment angle 904 is that such adjustment may cause phase angle matching of the stator with respect to the rotor to overcome the phase angle difference of one element, the rotor, with respect to the stator, at times of little wind or river flow activity versus heavy wind or river velocity and particularly when the phase angle variation is very small so that the automatic compensating movement of the adjustment angle 904 may be small. So simply put, moving stator 702 with respect to rotor 701 will impact adjustment angle 904.

Some wind machines are asynchronous. This means induction machines that operate slightly above synchronous speed. These do not require synchronization. Some wind machines are full-conversion DC machines. The generators produce DC which then goes through a DC to AC converter to become AC. These also generally do not require synchronization.

Some wind machines are doubly-fed induction machines in which the machine synchronizes itself. That is, the rotor is excited at a frequency that is related to the difference between system frequency and the rotating speed of the machine. This frequency is determined automatically, and provides inherent synchronization.

Referring now to FIG. 10, there is shown the MHK turbine of FIG. 1 as MHK turbine 1000 with an exemplary control system shown in some detail using a VPG 1001. MHK turbine 1000 receives water flow and the rpm of waterwheel shaft 502 will be increased by a gearbox 1004. Starting at upper left, shaft 502 turns gear 1004 which meshes with gear 1012 of an exemplary gear box. The gearbox may contain more or fewer gears than shown (for example, gears 1012, 1014, 1013, 1016 or more) and the gears meshed to increase or decrease rotational velocity between shaft 502 and shaft 1010 (preferably increase rpm of shaft 1010). Gear 1012 meshes with gear 1014, gear 1014 meshes with gear 1013 of the gearbox, and gear 1013 meshes with gear 1016 integral with or attached to shaft 1010. Gearbox output shaft 1010 rotates VPG rotor 852 and the rpm of shaft 1010/rotor 852 is controlled by sensing the shaft speed as determined by a sensor in control box 1006, in this example, sensing the output shaft 1010 rotational velocity as driven by the waterwheel shaft 502 through the gearbox 1004 (for example, gears 1012, 1014, 1013 and 1016). Measured rpm at control box 1006 will decide to actuate a motor, for example, a servo motor 1007 and the motor output may adjust stator 853 axially through a pair of worm and worm gear 1002, worm 1008 and worm gear 1009 or other choice of gears as is known in the art. In accordance with an embodiment of the present invention, the sensor of rotational velocity, for example, a tachometer, in control box 1006 (preferably a special purpose program controlled microprocessor and memory and speed sensor) may also provide a stator 853 control output of waterwheel shaft speed via stator control motor 1007, for example, a servo motor, (which may be rotor control alternately) to move a rotor/stator 852, 853 between a completely overlapping or maximum overlap position and a minimum overlap position with respect to each other. Power generated 1005 is for outputting power to a grid at preferably constant frequency, for example, 60 Hz in the US and 50 Hz in Europe. This invention embodiment is equally applicable to regulating a wind turbine power generation to a grid.

The principles of a VPG will now be discussed with reference to FIG. 8A (a fixed overlap of rotor 702 and stator 703 forms a fixed overlap power generator 800 housed in a housing with rotating shaft 701 extending from the housing. A variable power generator 850 having a slightly larger housing is shown in minimum overlap 860 (FIG. 8B) and maximum overlap 861 (FIG. 8C), for example, by sliding stator 853 axially and controlled to an infinite number of positions by a motor (not shown) if the rotor 852 is not to move with the shaft 701 as shown. The output 855 of movable stator 853 may be connected to a variable transformer or other device or wind or MHK turbine discussed above having various shafts, wind/water input shafts, control shafts and output shafts. Note that in an alternative embodiment, a rotor 852 may be moveable axially with respect to the stator 853 if needed to achieve minimum, medium and maximum torque (or any position in between). The moveable rotor 852 or stator 853 may be moved axially with respect to one another to achieve anywhere from a minimum to a maximum overlap by a motor and controlled to a value responsive to, for example, a high or low wind or river velocity by a wind/river flow sensor, an input shaft sensor or other shaft sensor (velocity or torque, for example). For example, as described above, a value may be stored in memory of a microprocessor based control associated with a minimum torque value (or velocity) or a maximum torque value (or velocity) for a given system and the variable torque/power generator controlled by the motor to match whether a minimum fluid (wind or water) velocity or maximum fluid velocity (or a velocity in between minimum and maximum) is currently being experienced by the wind or river turbine system. These variable torque/power generators may be added to an input compensating IVMC (infinitely variable motion control) device of any kind with a speed converter (or output shaft), for example, to convert output electric power to a grid at grid frequency (for example, 60 Hz or 50 Hz).

Four (4) independent concepts are described herein, but they are all related to variable overlap of rotor and stator assemblies and the application of these in a variable torque/power generator (VTG/VPG). The four independent concepts described herein comprise: (a) Extension of the VPG concept to motors (VPM): the extension comprising adjustment of the relative axial overlap between the rotor and stator to control speed and torque in, for example, a vehicle engine output independently (FIGS. 8B and 8C). The VPG extension may seem to be a good application for electric vehicles (EV's) (in electrical power generators used with the motors and the motors themselves): Elon Musk of Tesla or other manufacturers of electric vehicles using constant sources of power such as battery power may appreciate this suggestion of the use of variable output power generators. An internal combustion engine (actually a plurality of engine embodiments) in which the present concept may be applied to advantage is disclosed in pending U.S. application Ser. No. 14/225,658, filed Mar. 26, 2014, now allowed (and published as U.S. Published Patent Application 2014/02960616 on Oct. 2, 2014).

A second concept is for (b) mechanical synchronization between a rotor and a stator; discussed herein will be an adjustment of the relatively small angular relationship between the rotor and stator (per FIGS. 9A and 9B). This concept of rotating one moveable element in cross-section about the immoveable element (the stator) can be useful for synchronizing the lead/lag relationship between the rotor and stator in operation. For example, the regulation of adjustment angle 804 is useful for mechanical speed converters.

A third concept discussed herein is (c) providing a reciprocating input to a fixed/variable power generator generating electricity with a reciprocating rotor (not shown). This concept eliminates the need of Sprags from our speed converter, and reduces cost, weight, size, and potential validation time.

A fourth concept described herein is (d) Reactive VPG with respect to a waterwheel and generator used in wind or marine hydrokinetic (MHK) turbines—VPG may control torque to the waterwheel in our river or wind turbine (or any variable load); see FIGS. 3, 5, 7, and 9. A river turbine with a Hatch is described in priority U.S. Pat. No. 8,485,933 and further embodiments of a river turbine with Hatch control are disclosed in pending U.S. application Ser. No. 14/225,658 filed Mar. 26, 2014, now allowed (and published as U.S. Published Patent Application 2014/02960616 on Oct. 2, 2014). A wind turbine and VTG are also described in U.S. Pat. No. 8,388,481 and WO 2011/011358 of Mr. Han. Reactive torque control may, for example, control waterwheel speed up to a designed maximum and then Hatch control may be used to control waterwheel speed.

The second concept (mechanical synchronization) is a cousin to VPG since the relative relationship between the rotor and stator are being adjusted except one is linearly (axially) and the other angularly (radially) (as seen in cross sectional view FIG. 8B).

Extended Applications of VTG: VTM and Reactive Feedback Control

Variable Torque Generator (VTG) or Variable Power Generator (VPG)

Previously, U.S. Pat. Nos. 8,388,481 and 8,485,933 issued to Kyung Soo Han and a research paper, Development of a Variable Electromotive-Force Generator for a Wind Turbine, 7 pages, authored by W. D. Zhu et al., ASME 2012 International Mechanical Engineering Congress and Exposition, published November 9-15, via the University of Maryland Baltimore County (under Maryland Industrial Partnerships, MIPs, Grant) for VTG for Mr. Han and its applications described as a generator incorporated herein by reference as to their entire contents.

Referring to FIGS. 8A (fixed power generator), 8B, 8C, (variable power generators), the disclosed VTG/VPG device and generators of FIGS. 8B and 8C are capable of infinitely varying the required rotor torque by adjusting the relative overlap between the rotor and stator, one of which is associated with a shaft. A VTG/VPG can control torque independently of other controls. According to a concept of an embodiment of the present invention, generator torque controls for wind and MHK turbines may be controlled via VTG/VPG. Advantages include: the cut-in speed can be reduced close to zero and harness lower speed energy and rated speed can be increased to close to cut-out speed (the rated power of a generator can be increased when the rated speed increases). The VTG/VPG of FIG. 8B, 8C may be applied in an electric vehicle or an internal combustion engine as described in pending U.S. patent application Ser. No. 14/225,658 filed Mar. 26, 2014, now allowed (and published as U.S. Published Patent Application 2014/02960616 on Oct. 2, 2014).

Variable Torque Motor (VTM) or Variable Power Motor

The speed and torque of currently used variable speed motors can be varied with variable voltage/current, but they may be varied together in a fixed overlap relationship but each one may not be controlled independently. On the other hand, by adjusting the relative overlap between the rotor and stator the torque also can be controlled independently per FIGS. 8B and 8C.

Typical applications of use of VTG/VPG in this concept include Electric vehicle EV transmissions, generators and motors (for controlling speed and torque) and refrigerator and air-conditioner compressor controls (for controlling temperature). Advantages of use in any electric vehicle include: More miles to drive per battery charge, improved performance (better speed and torque control). Variation of synchronization of rotor with respect to stator by an adjustment angle applied to one or the other is shown in FIGS. 8B and 8C.

Reactive Power Control by Variable Torque Generator (VTG), Variable Power Generator Previously U.S. Pat. Nos. 8,388,481 and 8,485,933 issued to Kyung Soo Han and the above-referenced research paper were published by University of Maryland, Baltimore County (a grant from Maryland Industrial Partnerships, MIPS) for VTG for Mr. Han and its applications described as a generator. VTG as a generator is capable of infinitely varying the required rotor torque by adjusting the relative overlap between the rotor and stator as described above with reference to FIGS. 8A (fixed), 8B and 8C (variable). The VTG/VPG may match the output of the generator to the given input torque.

A feedback control system is a reactive control system by adjusting the VTG/VPG torque/rpm/power, the adjusted VTG/VPG torque/rpm/power transfers to the rotor, and the rotor speed will be adjusted accordingly (for example, waterwheel speed in a river/tidal/ocean current or MHK turbine). Typical Applications include and are not limited to wind turbines and MHK turbines as described above and disclosed in the issued patents and pending application described above. Advantages of such a reactive power control include: The cut-in speed can be reduced close to zero, the rated speed can be increased to close to cut-out speed, and the increased rated speed increases the rated power of the output, for example, FIGS. 10 and 11. The Hatch 102 may be controlled to limit or increase the flow of water to the waterwheel 103 and so the waterwheel speed.

A feedback control system being a reactive control system may be applied first, before Hatch control occurs, between the waterwheel shaft and the generator shaft output to be a reactive system to the flow of water via the Hatch. In a weak river flow situation, the VTG/VPG may be in a minimum torque position so that the output of the generator may be as great as possible, that is, the generator output shaft will require minimum torque to turn. As the water flow increases, it is desirable that the generator output be at maximum torque in reaction to an increased water flow and increased ability to turn the generator output shaft at, for example, 60 Hertz to feed a power grid.

Referring now to FIG. 10, there is shown the MHK turbine as MHK turbine 1000 with an exemplary control system shown in some detail using a VPG 1001. MHK turbine 1000 receives water flow and the rpm of waterwheel shaft 502 (waterwheel not shown) will be increased by a gearbox 1004. Starting at upper left, input shaft 502 turns gear 1012 of an exemplary gear box 1004. The gearbox may contain more or fewer gears than shown (for example, gears 1012, 1014, 1013, 1016 or more) and the gears meshed to increase or decrease rotational velocity between shaft 502 and shaft 1010 (preferably increase rpm of shaft 1010). Gear 1012 meshes with gear 1014 of the gearbox, and gear 1014 meshes with gear 1013, gear 1013 meshes with gear 1016 integral with or attached to shaft 1010. Gearbox output shaft 1010 rotates VPG rotor 852 and the rpm of shaft 1010/rotor 852 is controlled by sensing the shaft 1010 speed as determined by a sensor in control box 1006, in this example, sensing the output shaft 1010 rotational velocity as driven by the waterwheel shaft 502 through the gearbox 1004. Control box 1006 preferably comprises a special purpose, program controlled, microprocessor and memory for receiving the several sensed inputs, determining a value of control signals and outputting control signals. For example, measured rpm at control box 1006 will decide to actuate servo motor 1007. The servo motor output may adjust stator 853 axially through a pair of worm and worm gear 1002, worm 1008 and worm gear 1009 or other choice of gears as is known in the art. In accordance with an embodiment of the present invention, the sensor of rotational velocity, for example, a tachometer, in control box 1006 (preferably the special purpose program controlled microprocessor, memory and speed sensor or ASIC and outboard tachometer or other special purpose electronic circuits known in the art) may also provide a stator 853 control output of waterwheel shaft speed via stator control motor 1007, for example, a servo motor, (which may be rotor control alternately) to move a rotor/stator (852, 853) between a completely overlapping or maximum overlap position and a minimum overlap position with respect to each other. Power generated 1005 is for outputting electric power to a grid at preferably constant frequency, for example, 60 Hz in the US and 50 Hz in Europe. This invention embodiment is equally applicable to regulating a wind turbine power generation to a grid.

FIG. 11 further shows how to combine details of MHK turbine electric power generator control following principles introduced with reference to FIGS. 5, 6, and 10. An MHK turbine system 1100 of FIG. 11, by way of example, may have similar control applied in a wind turbine or other renewable source setting to match input rotational velocity to output power grid. Three forms of MHK control are shown: The first form of control is stator 853 control of a VPG 1001. The second form of control is Hatch 102 control of Hatch 102 and waterwheel 103. The third form of control is synchronizing control of rotor 853 and stator 852 of a VPG 1001. Each form of control will be explained separately. First the VPG 1001 control will be explained briefly. Input to waterwheel shaft 502 splits into two after increasing the rpm with a gearbox 1004: one circuit is to VPG shaft 701 and the other circuit is to left sun gear 310 of Transgear assembly 1103. A constant speed motor 1104 input will be driving right sun gear 330 of Transgear assembly 1103 through gear 1120 attached to sleeve/sheath 1118. The difference in rpm of left sun gear 310 and right sun gear 330 will be the output (carrier 407) and the output will be delivered to gear 1108/shaft 1109. Worm 1106 is attached to shaft 1109 and meshed with worm gear 1107. Worm gear 1107 is connected to port #1 of control box 1130. Control box 1130 may be a special purpose, program controlled processor, for example, a programmed microprocessor and memory for storing programs and values of measured parameters and desired values. There are two more inputs to control box 1130: one from the grid 1140 (port #4) and the other from stator output 855 also port #4). These are compared as to voltage and frequency at control box 1130. Control box port #2 radially adjusts stator 853. Control box port #5 axially adjusts stator 853 with respect to rotor 855. Control box port #4 is synchronizing the harnessed electricity to the grid power 1140 via VPG 1001. When they need to be synchronized, a servo motor may adjust the stator 853 radially and axially as follows.

The expected voltage, for example, 220 volts AC, three phase, of the power grid 1140 is compared with the output voltage of the VPG 1001 from stator 855 at port #4. The direction of movement indicated by control port #2 indicates moving the stator axially to compensate for differences in voltage. The expected frequency, for example, 50 Hz European or 60 Hz US or the phase angle, leading or lagging, of the power grid 1140 is compared to the same parameter from the stator 855 at port #4. Port #5 adjusts the stator 853 radially to increase or decrease overlap with rotor 852 and thus synchronize frequency or adjust phase angle between the electric power grid and the output of the MHK turbine 1100.

(b). Synchronization

1. Synchronization

Invention: This invention is applicable, for example, to power generators with constant input to a rotor. Since the rotor speed is constant, the frequency is assumed to be constant. If the frequency of generator and the power grid is out of phase, we may adjust the relative angular positions between the rotor and stator using a spur/helical gear or other Transgear gear assembly (for example, bevel gear, ring gear, N assignable variables where N is greater than or equal to 3) or other control to match the phase angle that the input and output frequencies are out of phase with one another (for example, referring to FIG. 9B, the rotor 702 may lead or lag the stator 703 by an angle 904 that may be compensated via adjusting angle 904 by moving the displacement of the rotor 702 radially with reference to the stator 703). Mechanical synchronization of the rotor 702 with the stator 703 is achieved by continuously measuring the phase angle 904 of the output versus the input and matching it continuously by controlling the adjustment angle 904 by moving the rotor with reference to the stator or vice versa.

2. Synchronization Techniques

The problem is formulated with respect to a wind turbine but may be applicable to MHK turbines and to how to synchronize a wind farm with a power grid. One answer may be found at: https://answers.yahoo.com/question/index?qid=20100305065433AAyR1Mp Question: How does one interconnect a wind farm with a power grid, how does one synchronize this connection so as to achieve a constant 60 Hz (or 50 Hz, European) output of power, or may any simulation in MATLAB demonstrate the synchronization impact?

Best Answer: The earliest wind generators were synchronous machines—NASA Mod-1 for example. These had to be synchronized by feathering the blades to control rotational speed. This technology was interesting, but not very practical, and blade pitch rotation is rarely used today.

A solution to synchronization is shown in FIGS. 9A and 9B wherein it is shown that an adjustment angle 904 is provided in cross-sectional view whereby a small adjustment angle 904 is provided for the stator 703 with respect to the rotor 702 (if one leads or lags the other) that may be controlled to assist in synchronization of input and output frequency. The advantage of the small synchronization adjustment angle 904 is that such adjustment may cause phase angle matching of the stator with respect to the rotor to overcome the phase angle difference of one element, the rotor, with respect to the stator, at times of little wind or river flow activity versus heavy wind or river velocity and particularly when the phase angle variation is very small so that the automatic compensating movement of the adjustment angle 904 may be small.

Some wind machines are asynchronous. This means induction machines that operate slightly above synchronous speed. These do not require synchronization. Some wind machines are full-conversion DC machines. The generators produce DC which then goes through a DC to AC converter to become AC. These also generally do not require synchronization.

Some wind machines are doubly-fed induction machines in which the machine synchronizes itself. That is, the rotor is excited at a frequency that is related to the difference between system frequency and the rotating speed of the machine. This frequency is determined automatically, and provides inherent synchronization.

Other Answers (1)

Wind farm generators are Asynchronous generators, or Induction generators. These are just cage induction motors that are driven slightly above synchronous speed. Under these conditions, the motor becomes a generator and, as it was connected to the supply when it was motoring, so separate synchronization is typically necessary.

Question: Which type of electrical generators is best to be used in wind turbines? See http://www.researchgate.net/post/Which_type_of_electrical_generator_is_best_to_be_used_in_wind_turbines?

Ashish Shrivastav•Hindustan Aeronautics Limited

If we analyze the commercially available wind turbine generators, it is found that direct drive, grid-connected generators indicate a future trend in the wind generation of power. The system reliability will increase by elimination of the gear boxes and the power electronic converters. Also the system efficiency will increase because the losses in the gear box and power electronic converters are eliminated.

Permanent Magnet Synchronous Generator (PMSG), Field excited synchronous generator (FESG) and the Induction Generator (IG) are three candidates for such applications. As permanent magnet excitation eliminates the excitation losses of a FESG, hence. PMSG will be a more favored option going forward. The direct drive, grid connected IG and PMSG generators are intended for fixed speed operations. When the PMSG generator is connected to the grid, the speed is determined by the grid frequency and is constant. So, if the torque to the generator is increased (sudden blow of wind), the generator will produce electromagnetic force to resist an increase in speed. Therefore, a blow of wind leads to large stresses on the wind turbine's drive train. However IG allows a small change of speed with the change of torque going to the generator and lower stresses/tear and wear of the drive train. As the IG and the PMSG machine have similar a Stator component, the cost difference is mainly due to the rotor. The PM's cost is always going to be more than that of aluminum, and one can see that the cost of the induction generator is expected to be much lower than the PMSG generators for the same power rating. But PMSG generators have higher efficiency so the higher material cost may be somewhat compensated for the extra electricity generated. Also, inductive power factor of the induction generators require capacitors for power factor correction and may increases the overall cost of the IG. So, a trade-off analysis is needed for case by case basis before declaring any one machine best for an application or an Installation.

In any wind turbine embodiment, a shared characteristic is that the output generator requires regulation with respect to wind speed and so the embodiment of FIG. 11 for synchronization of phase may be applied to control the wind turbine generator output via VPG by sensing the wind turbine propeller shaft speed and governing the torque and phase angle applied between generator rotor and stator by the principles of FIGS. 9A and 9B.

(c). Generator with Reciprocating Rotor

1. Cam Driven Speed Converter with Sprags

Prior Art:

US patents have issued to DDMotion for cam driven speed converters. A speed converter controls the given input to a required output. Commonly known speed converters are transmission for vehicles. A wind turbine has a power converter (or variable frequency converter) and the power converter converts harnessed variable power by rotor to grid compatible constant frequency power—a constant desired output. A speed converter converts (mechanical) rotational power (torque and rotational speed), (frequency is constant when the rotational speed is constant) and power converter converts the mechanical input propeller shaft velocity to electrical power (voltage, current, and frequency).

Typical Applications: Wind turbines, MHK turbines

Advantages: harnessing grid compatible constant electricity without power grooming (no heat, no power loss, less failures, economical), durable, scalable, generate more electricity by lowering the cut-in speed, increasing the rated speed (rated power), eco/fish friendly, and protect the system from floating debris.

2. Cam Driven Speed Converter without Sprags

Cam driven speed converters may have Sprags to convert reciprocating input to continuously rotating output. The use of Sprags may be familiar with the automotive industry since they are used in automatic transmissions. As differentiated from the prior art, cam driven speed converters are shown in FIGS. 6 and 7 and described in priority U.S. patent application Ser. No. 14/829,354 (the '354 patent application) filed Aug. 18, 2015 by Kyung Soo Han. The cam driven speed converters (variable pitch cam shown in FIG. 6, concentric cam FIG. 6A and eccentric cam FIG. 6B, and applications of variable pitch cams shown in FIG. 7, speed converters of FIGS. 7A rotary output with Sprags and 7B electrical output by generating electricity with reciprocating rotor) may be used to convert rotary energy to rotary energy or electricity with/without the use of Sprags. When a speed converter is converting rotary energy to electrical energy, the cost of a speed converter can be reduced: the reciprocating output of a cam driven speed converter can be connected and a generator with a reciprocating rotor can generate grid compatible electricity. The generator can be a conventional fixed overlap generator or VPG.

Referring to FIGS. 6A and 6B of the '354 patent application, there are shown in FIGS. 6A and 6B, a cam that may be converted from a concentric cam to an eccentric cam enlarging its effective cam profile. The concentric cam/eccentric cam is also found in recently issued U.S. Pat. No. 9,017,208 to Kyung Han as FIG. 7, cam controlled infinitely variable motion control (IVMC). To convert a constant speed input to an infinitely variable output, an infinitely variable speed converter is needed. A cam controlled IVMC converts a constant input speed into sinusoidal waveforms using a variable pitch cam per FIGS. 6A and 6B, rectifies half waves and superimposes all the rectified sinusoidal waveforms into an output. The building blocks necessary for the IVMC system will now be described.

As shown in FIGS. 6A and 6B of the '354 patent application, a variable pitch cam assembly 600 comprises an eccentric inner cam surrounding a shaft and an eccentric outer cam assembled to freely move around the eccentric inner cam. Both inner cam and outer cam form perfectly round circles except that they are bored eccentrically. Outer cam may freely rotate around inner cam to form minimum eccentric cam profile per FIG. 6A and maximum eccentric cam profile per FIG. 6B. These cams with an infinitely variable control can produce infinitely variable eccentricity from a minimum effective cam profile of FIG. 6A where the outer cam is concentric with respect to the center of cam shaft 601 per FIG. 6A to a maximum effective cam profile per FIG. 6B where the outer cam is eccentric relative to the center of cam shaft 601. Since both inner and outer cams are mounted on and around the input cam shaft 601, producing the parts for variable pitch cam 600 is simple, and the design can handle higher torque compared, for example, to a crankshaft with an offset shaft.

Referring now to FIGS. 7A and 7B of the '354 priority patent application, two speed converters are shown. In FIG. 7A, the output shaft 705 is delivering rotary output with output gears 706 imbedded with Sprags 707 wherein FIG. 7B shows a speed converter having output gears 756 without Sprags 707 and a VPG is attached to the output shaft 705/765, rotor 757 and stator 758. Shaft 705 is extended in FIG. 7B to comprise shaft extension 765 compared with the FIG. 7A Sprag embodiment. The Sprags are eliminated in FIG. 7B. The reciprocating output diagram for a typical DDMotion speed converter for one of an MHK and a wind turbine electric power generator having a shaft input 701 show speed control (propeller shaft or waterwheel shaft versus output shaft speed), the shaft input being controlled by a control shaft 704 having an overlapping sleeve and Transgear assemblies for regulating an output 705, 755. The output according to the present invention may be further regulated by use of VPG 757, 758 to control stator 758 to a constant output velocity of, for example, 60 Hz.

Per FIG. 7A of the '354 patent application, right sun gear/sleeve/sheath 704 controls the eccentricity of variable pitch cams. The small bores in the outer cams (no reference numeral shown) may be housed by outer cam pins. The outer cam pins may control the outer cam position since they are also located in slots of slotted gears (the three large gears, not numbered, meshing with gears 702). In this manner, a reciprocating motion is performed that may be used per FIG.

7B as concentric/eccentric cam 756 associated with driver 759 regulates VPG 757, 758 in FIG. 7B. The eccentric/concentric cams 756 (FIG. 6A, FIG. 6B are driven by driver 759). Further details of a variable pitch cam 756 and associated driver 759 are shown and described in detail by corresponding description in the specification of FIGS. 7 and 9, respectively, of U.S. Pat. No. 8,641,570 for describing a cam-controlled speed converter of FIG. 10, shown in the '354 patent application as FIG. 7A.

Typical Applications include wind Turbines, MHK Turbines and other power generating turbines. Advantages include: scalable, reduced cost, size, weight, and a potential repair in the future.

Referring to FIG. 12, FIG. 12 shows first and second arrangements 1200 for mounting an MHK turbine for receiving water flow 1201 from the left as a bottom mount 1202 (for example, on a river bottom platform) and as a top mount 1203 (for example, from a floating platform, a boat or the bottom of a dock). FIG. 12 shows first and second side views of a MHK turbine 1200 of the present invention that is bottom-fed 1203 or mounted to the bottom of a floating platform so that water flows downward under the block and into the waterwheel which is shown with an open hatch. The gearbox and generator may preferably be on deck of the floating platform 1203 and preferably contained in a housing and maintained dry. On the other hand, per FIG. 13, an MHK turbine may be mounted to the bottom on a bottom mount 1203.

Referring to FIG. 13, FIG. 13 shows a top view of first and second arrangements 1300 of a side mount of an MHK turbine for receiving water flow 1301 from the top as a right side mount 1302 and a left side mount 1303 (these turbines may be mounted to the left and right sides of a bridge piling, a dock piling, an underwater wall confining, for example, a canal or stream). FIG. 13 comprise top views of first and second side-fed run-of-the-river turbines 1302, 1303 of the present invention mounted to a vertical wall that may be a continuous wall. Alternatively, the vertical wall may be contoured, for example, a bridge support piling. These may be already existing pilings that may be seen and avoided by river traffic. The principle of a side-fed turbine is the same as with any MHK turbine. The blocks should act as penstocks and increase the velocity of river water 1301 flowing to the waterwheels 1302 and 1303 which face into the water flow 1301. In FIG. 13, the side-fed MHK turbines, in alternative embodiments may be under or on a horizontal platform having a vertical wall constructed thereon or thereunder. The vertical wall may be a wall of a canal or other wall running lengthwise along a flowing water stream or other source of water current such as an ocean bulkhead.

Referring to FIG. 14A and FIG. 14B, FIG. 14A shows a top view of an arrangement 1400 of two MHK turbines mounted together, for example, on a pole or surrounding a bridge piling or dock piling whereby if the water flow 1401 is from left to right, then, turbine 1404 generates power and if the water flow is from right to left, then, turbine 1405 generates power. FIG. 14B shows a side view of an embodiment 1450 having MHK turbines 1452 and 1453. A gear 1410, for example, may control two Hatches 1402, 1452 and 1403, 1453 so that they are open or close in synch. FIGS. 14A and 14B show exemplary embodiments for use, for example, in a tidal estuary where the tide may shift direction of river flow from toward the inland (high tide) to toward the ocean (low tide) wherein, for example, each of two turbines 1402, 1403 are oppositely aligned so that one or the other is actuated during either high or low tide. In FIG. 14A, water flow 1401 is from left to right. If water flows from right to left, water flows up the ramp of the block of turbine 1402 to an open hatch and actuates its waterwheel to turn. On the other hand, the hatch of turbine 1403 is closed as determined by the direction of water flow. In FIG. 14A, the hatch of turbine 1403 is closed until the direction of water flow shifts from the tide to direction 1401 or from left to right so the hatch of turbine 1402 may be open so that its waterwheel may turn with the water flow velocity of flow 1401. In FIG. 14B, the effect is similar to FIG. 14A.

Referring to FIGS. 15A and 15B, FIG. 15A shows a top view of an MHK turbine swivel-mounted to a central axis of the MHK turbine 1503 having a water vane so that the water flow 1501 may change direction and the facing of the MHK turbine 1503 into the water flow 1501 is consistent. FIG. 15B shows a side view of an MHK turbine swivel-mounted to the central axis of the MHK turbine 1502, for example, mounted at the bottom of a river or tidal stream (or mounted from the top, not shown, as per FIG. 12. FIG. 15A and FIG. 15B comprise a top view and front view of a side-fed MHK turbine 1503 mounted for rotational movement to a pole secured, for example, to a floating platform or to a river or ocean bed via a footing 1502 where the gear assemblies and generator may be located and whereby a tail wing 1504 may serve to point the side-fed MHK turbine 1503 into the direction of water flow as the MHK turbine may rotate to face the water flow. The hatch may be controlled independently as discussed above. A gearbox and generator may be either at the top or at the bottom (footing 1502). The flow media may be water (or air) but preferably water and may be tidal, the tides swinging the turbine 1503 all the way around to face either high tide or low tide flow.

The principles of application of the several discussed embodiments of a structure and method of constructing same for, for example, providing a green energy alternative to the burning of fuel such as coal, oil or other less environmentally friendly energy sources have been demonstrated above using a spur/helical gear assembly of sun gears and planetary gears and a VPG control assembly, for example, in a wind or MHK turbine electric power generator. The present embodiments used in conjunction with known flow energy turbine systems may be enhanced by using many known control systems for improved operation such as pitch and yaw control in wind turbines, control responsive to power grid statistics and requirements and remote or automatic control responsive to predicted and actual weather conditions (wind velocity from an anemometer, water flow velocity from a water flow velocity meter, barometric reading and direction (rising or falling) and the like). These and other features of embodiments and aspects of a variable flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A marine hydrokinetic electric power generator comprising
    a variable power generator coupled to an input shaft and to an output shaft, the variable power generator comprising a rotor and a stator axially adjustable along the output shaft so that the rotor may be displaced with respect to the stator or the stator may be displaced with respect to the rotor, the variable power generator with a minimum displacement and complete overlap of rotor and stator and a maximum torque value in one position and with a maximum displacement and relative non-overlap of rotor and stator and a minimum torque value in another position, the input shaft for rotating at a variable rotational velocity and the output shaft for rotating at a different, constant rotational velocity, a sensor for sensing one of phase angle, torque, input shaft velocity and output shaft velocity and an adjustment control responsive to the sensor for controlling an adjustment of the position of the rotor with respect to the stator or the stator with respect to the rotor of the variable power generator, and a controller responsive to the sensor, the controller having a first port connected to a power grid and a second port responsive to the sensor, the first port for continuously adjusting one of the stator and the rotor with respect to the rotor and the stator respectively, the first port and the second port being controlled by the controller to match frequency and voltage values of the output of the marine hydrokinetic electric power generator to the frequency and voltage values of the power grid via the continuous adjustment control.

2. The marine hydrokinetic electric power generator of claim 1 wherein the sensor comprises a sensor of phase angle, the variable power generator of output shaft, rotor and stator further comprising a motor for adjusting the relative rotor and stator position to synchronize the phase angle.

3. The marine hydrokinetic electric power generator of claim 2 wherein the motor comprises a servo motor for adjusting the position of the stator with respect to the rotor, the rotor being integral with or connected to the output shaft of the variable power generator.

4. The marine hydrokinetic electric power generator of claim 3 wherein one of the stator and the rotor outputs a constant value of electric power frequency and voltage given a varying amount of input water flow velocity.

5. The marine hydrokinetic electric power generator of claim 1 wherein the sensor comprises a sensor of phase angle, the variable power generator of rotor and stator further comprising a spur/helical planetary gear assembly for controlling the phase angle relationship between rotor and stator.

6. The marine hydrokinetic electric power generator of claim 5, the marine hydrokinetic electric power generator having an input shaft for driving a second shaft having an integral or attached sun gear, the second shaft surrounded by a sleeve having an integral or attached sun gear and a surrounding planetary gear assembly, the sleeve having a further gear connected to a constant speed motor, the marine hydrokinetic electric power generator further comprising a variable power generator coupled to the second shaft, the spur/helical planetary gear assembly adjusting a stator with respect to a rotor of the variable power generator for providing a constant output current frequency and voltage.

7. The marine hydrokinetic electric power generator of claim 6 wherein the marine hydrokinetic electric power generator is coupled by a gear box to a second gear attached to or integral with the second shaft, the second gear for meshing with a gear integral with or attached to the output shaft of the variable power generator.

8. The marine hydrokinetic electric power generator of claim 6 wherein the spur/helical planetary gear assembly comprises one of greater than or equal to three assignable variables to one of input, output and control and a plurality of three assignable variable planetary gear assemblies.

9. The marine hydrokinetic electric power generator of claim 1 wherein the sensor comprises a sensor of one of input shaft and output shaft rotational velocity and the sensor provides an output to the controller to control hatch position with respect to a waterwheel of the marine hydrokinetic turbine and an output to the controller for controlling the variable power generator electric output to a relatively constant frequency and voltage for feeding the power grid.

10. The marine hydrokinetic electric power generator as recited in claim 1 wherein a shaft is coupled to the rotor of the variable power generator, the rotor of the variable power generator being integral with or connected to one of an input shaft and an output shaft of the marine hydrokinetic turbine.

11. The marine hydrokinetic electric power generator as recited in claim 1 wherein a shaft is coupled to the rotor of the variable power generator and to an input shaft having a rotational velocity responsive to varying water flow, the rotor of the variable power generator being integral with or connected to one of an input shaft and an output shaft of a marine hydrokinetic turbine for driving an electric power generator at constant rotational velocity for delivery to an electric power grid.

12. The marine hydrokinetic electric power generator as recited in claim 1 wherein the variable power generator comprises the rotor and the stator, the stator being moveable and the rotor being integral with or connected to a shaft of a speed converter of the marine hydrokinetic electric power generator.

13. The marine hydrokinetic electric power generator as recited in claim 12, the speed converter comprising a cam controlled speed converter, the cam control comprising an inner cam and a surrounding outer cam, the inner cam having a central shaft, the inner cam and outer cam being relatively moveable from a position of being concentric and having a minimum eccentricity to a position of maximum eccentricity profile for operation with a driver.

14. The marine hydrokinetic electric power generator as recited in claim 13, the cam controlled speed converter further comprising a three variable spur/helical gear assembly for providing a control input to the variable power generator of the rotor and the stator.

15. A marine hydrokinetic electric power generator having an input shaft and gear assembly for increasing rotational speed of a shaft of a variable power generator comprising a rotor and stator moveable with respect to one another, the marine hydrokinetic power generator further having a shaft integral with or attached to a rotor of a variable power generator, the variable power generator further comprising a stator axially surrounding the rotor and displaceable with respect to the rotor by a motor, the marine hydrokinetic electric power generator further comprising program controlled computer processor, responsive to a sensor for sensing phase, frequency and voltage of a power grid and generator input shaft rotational velocity, the program controlled processor having a memory, the electronic control for receiving a rotational velocity measure of the generator input shaft via the sensor and for determining a desired position of the stator with respect to the rotor for outputting constant power output frequency and voltage to an electric power grid and in phase with the electric power grid power with respect to a variable input shaft rotational velocity and responsive to variable water flow velocity turning the input shaft of the marine hydrokinetic electric power generator.

16. The marine hydrokinetic electric power generator of claim 15 adaptable for use in a wind turbine for regulating variable wind velocity with respect to constant desired electric power output frequency and voltage.

17. The marine hydrokinetic electric power generator of claim 15, the input shaft of the marine hydrokinetic electric power generator coupled to the variable power generator input shaft through a gearbox.

18. The marine hydrokinetic electric power generator of claim 15 wherein the variable power generator has a displacement control assembly comprising a servo motor, a control box connected to the servo motor and a worm and worm gear for adjusting the stator axial position with respect to the rotor of the variable power generator to deliver electric power in phase to the electric power grid at the frequency and voltage values of the electric power grid.

19. A cam-controlled speed converter of a marine hydrokinetic electric power generator for producing a constant output speed from a variable input speed, the cam-controlled speed converter comprising a driver assembly of an output shaft, the output shaft of a variable power generator having a rotor integral with or attached to the output shaft, the speed converter further comprising an input shaft having a variable speed of rotation coupled to a control shaft, the output shaft further having the variable power generator further comprising a stator surrounding the output shaft, the rotor and stator of the variable power generator being displaceable from a position of maximum overlap to a position of minimum overlap for regulating power output to a grid at relatively constant frequency and voltage via the output shaft.

20. The cam-controlled speed converter of claim 19, the driver assembly reciprocating to generate a relatively constant electric power output frequency via the output shaft.

* * * * *